United States Patent
Tong et al.

(10) Patent No.: US 7,949,061 B2
(45) Date of Patent: May 24, 2011

(54) SCATTERED PILOT PATTERN AND CHANNEL ESTIMATION METHOD FOR MIMO-OFDM SYSTEMS

(75) Inventors: Wen Tong, Ottawa (CA); Peiying Zhu, Kanata (CA); Jianglei Ma, Kanata (CA); Ming Jia, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 0 days.

(21) Appl. No.: 12/830,791

(22) Filed: Jul. 6, 2010

(65) Prior Publication Data

US 2010/0271930 A1 Oct. 28, 2010

Related U.S. Application Data

(63) Continuation of application No. 11/529,246, filed on Sep. 29, 2006, now Pat. No. 7,778,337, which is a continuation-in-part of application No. 10/038,883, filed on Jan. 8, 2002, now Pat. No. 7,248,559.

(60) Provisional application No. 60/329,509, filed on Oct. 17, 2001.

(51) Int. Cl.
*H04K 1/10* (2006.01)
*H04L 27/28* (2006.01)

(52) U.S. Cl. ........ 375/260; 375/267; 375/347; 370/334; 455/101

(58) Field of Classification Search .................. 375/260, 375/267, 299, 347; 455/101; 370/334
See application file for complete search history.

(56) References Cited

U.S. PATENT DOCUMENTS

| | | | |
|---|---|---|---|
| 5,867,478 A | 2/1999 | Baum et al. |
| 6,298,035 B1 | 10/2001 | Heiskala |
| 6,359,938 B1 | 3/2002 | Keevill et al. |
| 6,473,393 B1 | 10/2002 | Ariyavisitakul et al. |
| 6,654,429 B1 | 11/2003 | Li |
| 7,145,940 B2 | 12/2006 | Gore et al. |
| 7,248,559 B2 | 7/2007 | Ma et al. |
| 7,545,734 B2 | 6/2009 | Ma et al. |
| 7,551,546 B2 | 6/2009 | Ma et al. |
| 2002/0003774 A1 | 1/2002 | Wang et al. |
| 2002/0034213 A1 | 3/2002 | Wang et al. |
| 2002/0080887 A1 | 6/2002 | Jeong et al. |
| 2002/0122383 A1 | 9/2002 | Wu et al. |
| 2002/0144294 A1 | 10/2002 | Rabinowitz et al. |
| 2002/0181390 A1 | 12/2002 | Mody et al. |
| 2003/0016621 A1 | 1/2003 | Li |
| 2003/0072254 A1 | 4/2003 | Ma et al. |

OTHER PUBLICATIONS

Fernández-Getino Garcia, Ma Julia et al; Efficient Pilot Patterns for Channel Estimation in OFDM Systems Over HF Channels; IEEE Sep. 19, 1999; pp. 2193-2797; XP-000896002.

(Continued)

*Primary Examiner* — Ted M Wang

(57) ABSTRACT

Methods and apparatus are provided for inserting data symbols and pilot symbols in an OFDM (orthogonal frequency division multiplexing) transmission resource utilizing frequency hopping patterns for the data symbols and/or the pilot symbols. Data symbols and pilot symbols are allocated for down link (base station to mobile station) and up link (mobile station to bases station) transmission resources in a two-dimensional time-frequency pattern. For each antenna of a MIMO-OFDM (multiple input multiple output OFDM) communication system, pilot symbols are inserted in a scattered pattern in time-frequency and data symbols are inserted in an identical frequency-hopping pattern in time-frequency as that of other antennas.

16 Claims, 20 Drawing Sheets

OTHER PUBLICATIONS

Jones, V.K.; Raleigh, Gregory G.; Channel Estimation for Wireless OFDM Systems; IEEE Aug. 11, 1998; pp. 980-985; XP-000825895.

Specification of U.S. Appl. No. 12/468,628, filed May 12, 2009.

Mincai, Qiu, Wenyi, Guo; The Theories of W-CDMA and CDMA2000 in the Third Mobile Communications Systems and the Draft for Implementation (II); Modem Science & Technology of Telecommunications; No. 11, pp. 24-26, Nov. 2000.

EN 300 744 V.1.1.2, Digital Video Broadcasting (DVB); Framing structure, channel coding and modulation for digital terrestrial television, Aug. 1997.

SCATTERED PILOT PATTERN AND CHANNEL ESTIMATION METHOD FOR MIMO-OFDM SYSTEMS

RELATED APPLICATION

This application is a continuation application of U.S. patent application Ser. No. 11/529,246 filed Sep. 29, 2006, which is a continuation-in-part of U.S. patent application Ser. No. 10/038,883 filed Jan. 8, 2002 and the present application incorporates the subject matter of the two previous applications in their entirety herein by reference. U.S. patent application Ser. No. 10/038,883 claims the benefit of U.S. Provisional Application No. 60/329,509, filed Oct. 17, 2001, the contents of which are also incorporated in their entirety herein by reference.

FIELD OF THE INVENTION

This invention relates to OFDM communication systems, and more particularly to a more efficient use of pilot symbols within such systems.

BACKGROUND OF THE INVENTION

Multiple Input Multiple Output—Orthogonal Frequency Division Multiplexing (MIMO-OFDM) is a novel highly spectral efficient technology used to transmit high-speed data through radio channels with fast fading both in frequency and in time.

In wireless communication systems that employ OFDM, a transmitter transmits data to a receiver using many sub-carriers in parallel. The frequencies of the sub-carriers are orthogonal. Transmitting the data in parallel allows the symbols containing the data to be of longer duration, which reduces the effects of multi-path fading. The orthogonality of the frequencies allows the sub-carriers to be tightly spaced, while minimizing inter-carrier interference. At the transmitter, the data is encoded, interleaved, and modulated to form data symbols. Overhead information is added, including pilot symbols, and the symbols (data plus overhead) are organized into OFDM symbols. Each OFDM symbol typically uses $2^n$ frequencies. Each symbol is allocated to represent a component of a different orthogonal frequency. An inverse Fast Fourier Transform (IFFT) is applied to the OFDM symbol (hence the preference of $2^n$ frequencies) to generate time samples of a signal. Cyclic extensions are added to the signal, and the signal is passed through a digital-to-analog converter. Finally, the transmitter transmits the signal to the receiver along a channel.

When the receiver receives the signal, the inverse operations are performed. The received signal is passed through an analog-to-digital converter, and timing information is then determined. The cyclic extensions are removed from the signal. The receiver performs an FFT on the received signal to recover the frequency components of the signal, that is, the data symbols. Error correction may be applied to the data symbols to compensate for variations in phase and amplitude caused during propagation of the signal along the channel. The data symbols are then demodulated, de-interleaved, and decoded, to yield the transmitted data.

In systems employing differential detection, the receiver compares the phase and/or amplitude of each received symbol with an adjacent symbol. The adjacent symbol may be adjacent in the time direction or in the frequency direction. The receiver recovers the transmitted data by measuring the change in phase and/or amplitude between a symbol and the adjacent symbol. If differential detection is used, channel compensation need not be applied to compensate for variations in phase and amplitude caused during propagation of the signal. However, in systems employing coherent detection the receiver must estimate the actual phase and amplitude of the channel response, and channel compensation must be applied.

The variations in phase and amplitude resulting from propagation along the channel are referred to as the channel response. The channel response is usually frequency and time dependent. If the receiver can determine the channel response, the received signal can be corrected to compensate for the channel degradation. The determination of the channel response is called channel estimation. The inclusion of pilot symbols in each OFDM symbol allows the receiver to carry out channel estimation. The pilot symbols are transmitted with a value known to the receiver. When the receiver receives the OFDM symbol, the receiver compares the received value of the pilot symbols with the known transmitted value of the pilot symbols to estimate the channel response.

The pilot symbols are overhead, and should be as few in number as possible in order to maximize the transmission rate of data symbols. Since the channel response can vary with time and with frequency, the pilot symbols are scattered amongst the data symbols to provide as complete a range as possible of channel response over time and frequency. The set of frequencies and times at which pilot symbols are inserted is referred to as a pilot pattern. The optimal temporal spacing between the pilot symbols is usually dictated by the maximum anticipated Doppler frequency, and the optimal frequency spacing between the pilot symbols is usually dictated by the anticipated delay spread of multi-path fading.

The existing pilot-assisted OFDM channel estimation approaches are designed for conventional one transmitter system. With a scattered pilot arrangement, there are three classes of algorithms:

1-D frequency interpolation or time interpolation
Transformed frequency 1-D interpolation
Independent time and frequency 1-D interpolation The first class of algorithms is based on the pilot OFDM symbol (all the sub-carriers are used as the pilots) or comb-type of pilots. This approach shown in the flow chart of FIG. 1A is simple but only suitable for channels with high frequency selectivity or channels with high time fading. The method involves pilot extraction in the frequency domain (step 1A-1) followed by interpolation in time (step 1A-2), or interpolation in frequency (step 1A-3).

The second method shown in the flow chart of FIG. 1B is aimed for channels with slow Doppler fading and fast frequency fading. It improves the first method by using FFT to reconstruct the channel response back to time domain for noise reduction processing at the expense of FFT/IFFT computing for the channel estimation separately. The method begins with pilot extraction in the frequency domain (step 1B-1), which may be followed by interpolation in frequency (step 1B-2). Then an inverse fast Fourier transform (step 1B-3), smoothing/de-noise processing (step 1B-4), and finally a fast Fourier transform (1B-5) steps are executed.

The third method shown in the flow chart of FIG. 1C can be used to estimate channel for mobile applications, where both fast time fading and frequency fading exist. However it needs a relatively high density of pilots and a completed interpolator. This method involves pilot extraction in the frequency domain (step 1C-1) this is followed by interpolation in time (step 1C-2) and interpolation in frequency (step 1C-3).

In the propagation environment with both high frequency dispersion and temporal fading, the channel estimation performance can be improved by the increase of pilot symbol density at the price of the reduction of the spectral efficiency of the data transmission. To interpolate and reconstruct the channel response function from the limited pilots to achieve reliable channel estimation with the minimum overhead is a challenging task.

There are a variety of existing standard pilot patterns. In environments in which the channel varies only slowly with time and frequency, the pilot symbols may be inserted cyclically, being inserted at an adjacent frequency after each time interval. In environments in which the channel is highly frequency dependent, the pilot symbols may be inserted periodically at all frequencies simultaneously. However, such a pilot pattern is only suitable for channels that vary very slowly with time. In environments in which the channel is highly time dependent, the pilot symbols may be inserted continuously at only specific frequencies in a comb arrangement to provide a constant measurement of the channel response. However, such a pilot pattern is only suitable for channels that vary slowly with frequency. In environments in which the channel is both highly frequency and highly time dependent (for example, mobile systems with much multi-path fading), the pilot symbols may be inserted periodically in time and in frequency so that the pilot symbols form a rectangular lattice when the symbols are depicted in a time-frequency diagram.

In OFDM communication systems employing coherent modulation and demodulation, the receiver must estimate the channel response at the frequencies of all sub-carriers and at all times. Although this requires more processing than in systems that employs differential modulation and demodulation, a significant gain in signal-to-noise ratio can be achieved using coherent modulation and demodulation. The receiver determines the channel response at the times and frequencies at which pilot symbols are inserted into the OFDM symbol, and performs interpolations to estimate the channel response at the times and frequencies at which the data symbols are located within the OFDM symbol. Placing pilot symbols more closely together (in frequency if a comb pattern is used, in time if a periodic pattern is used, or in both frequency and in time if a rectangular lattice pattern is used) within a pilot pattern results in a more accurate interpolation. However, because pilot symbols are overhead, a tighter pilot pattern is at the expense of the transmitted data rate.

Existing pilot patterns and interpolation techniques are usually sufficient if the channel varies slowly with time (for example for nomadic applications). However, if the channel varies quickly with time (for example, for mobile applications), the time interval between pilot symbols must be reduced in order to allow an accurate estimation of the channel response through interpolation. This increases the overhead in the signal.

The problem of minimizing the number of pilot symbols while maximizing the accuracy of the interpolation is also particularly cumbersome in Multiple-Input Multiple-Output (MIMO) OFDM systems. In MIMO OFDM systems, the transmitter transmits data through more than one transmitting antenna and the receiver receives data through more than one receiving antenna. The binary data is usually divided between the transmitting antennae, although the same data may be transmitted through each transmitting antenna if spatial diversity is desired. Each receiving antenna receives data from all the transmitting antennae, so if there are M transmitting antennae and N receiving antennae, then the signal will propagate over M×N channels, each of which has its own channel response. Each transmitting antenna inserts pilot symbols into the same sub-carrier location of the OFDM symbol which it is transmitting. In order to minimize interference at the receiver between the pilot symbols of each transmitting antenna, each transmitting antenna typically blinks its pilot pattern on and off. This increases the temporal separation of the pilot symbols for each transmitter, reducing the accuracy of the interpolation used to estimate the channel response. In MIMO-OFDM systems a simple and fast channel estimation method is particularly crucial because of the limitation of the computational power for estimating M×N channels, while in SISO-OFDM system only one channel needs to be estimated.

SUMMARY OF THE INVENTION

According to a first aspect of the invention, there is provided a method for inserting data and pilot symbols into an Orthogonal Frequency Division Multiplexing (OFDM) transmission resource for transmission on N transmitting antenna where $N \geq 2$, the OFDM transmission resource having a time domain and a frequency domain, each OFDM transmission resource comprising a plurality of OFDM symbols, the method comprising the steps of: for each antenna, inserting pilot symbols in a respective pattern in time-frequency; and inserting data symbols in a frequency-hopping pattern in time-frequency that is identical for all the antennas, wherein the pilot symbols for each antenna are inserted such that pilot symbols from other antennas do not occupy the same location in time-frequency.

In some embodiments, inserting data symbols in a frequency-hopping pattern in time-frequency comprises inserting data symbols on a set of spaced apart subcarriers that change each symbol duration of a plurality of symbol durations.

In some embodiments, inserting pilot symbols in a respective pattern in time-frequency comprises: inserting pilot symbols that form at least one diagonal arrangement in time-frequency.

In some embodiments, inserting pilot symbols comprises: when N is equal to two, for each antenna, alternating insertion of null symbol locations and pilot symbols in the at least one diagonal arrangement for a first antenna of the pair of antennas and alternating insertion of pilot symbols and null symbol locations in at least one diagonal arrangement for a second antenna of the pair of antennas, wherein the null symbol locations of the first antenna correspond to a same location in time-frequency as the pilot symbols of the second antenna, and vice versa.

In some embodiments, inserting pilot symbols comprises: when N is equal to two, for each antenna; inserting pilot symbols in a respective first diagonal arrangement in time-frequency, and inserting null symbol locations in a respective second diagonal arrangement in time-frequency, wherein the respective first diagonal arrangement and the respective second diagonal arrangement are parallel and the null symbol locations of a first antenna of the pair of antennas occur at a same location in time-frequency as the pilot symbols of a second antenna of the pair of antennas, and vice versa.

In some embodiments, the method further comprises for at least one antenna of the N transmitting antenna, inserting a larger number of pilot symbols in time-frequency such that the density of pilot symbols for the at least one antenna is higher than for other antennas.

In some embodiments, when the pilot symbols are inserted in a pattern having at least two diagonal arrangements in time-frequency, the at least two diagonal arrangements are parallel and offset by a particular distance in time-frequency.

In some embodiments, the offset between the at least two diagonal arrangements in a direction normal to the diagonal lines is variable for different patterns.

In some embodiments, inserting data symbols on a set of spaced apart subcarriers comprises: inserting data symbols on a set of spaced apart subcarriers that are either a set of consecutive spaced apart subcarriers or a set of subcarriers forming a logical subband of subcarriers.

In some embodiments, the OFDM transmission resource is utilized for transmitting from one or more mobile stations collectively comprising the N antennas to a base station.

In some embodiments, inserting data symbols in a frequency-hopping pattern in time-frequency comprises inserting data symbols on a set of subcarriers that is constant over a set of consecutive symbol durations, and change for each set of multiple sets of consecutive symbol durations.

In some embodiments, inserting data symbols on a set of subcarriers that is constant over a set of consecutive symbol durations comprises: inserting data symbols on a set of subcarriers that are either a set of consecutive subcarriers or a set of subcarriers forming a logical subband of subcarriers.

In some embodiments, inserting pilot symbols in a respective pattern in time-frequency comprises: for each antenna transmitting a data symbol stream comprising a series of data symbols, by: for each frequency hop, inserting at least one pilot symbol in a corresponding number of OFDM symbols amongst a plurality of data symbols on a different pair of subcarriers of an allocated transmission bandwidth than a pair of subcarriers of a previous frequency hop for a previous plurality of data symbols and at least one pilot symbol of the series of data symbols.

In some embodiments, inserting one or more pilot symbols in a plurality of OFDM symbols at a different pair of subcarriers comprises: when N is equal to two, for each antenna; inserting a null symbol location and pilot symbol for a first antenna of the pair of antennas and inserting a pilot symbol and a null symbol location for a second antenna of the pair of antennas, wherein the null symbol location of the first antenna is inserted at the same location in time-frequency as the pilot symbol of the second antenna, and vice versa.

In some embodiments, the method further comprises inserting data and pilot symbols in an OFDM resource for an additional group of N transmitting antennas wherein inserting pilot symbols in a respective pattern in time-frequency for the additional group of N transmitting antennas comprises: employing the same respective pattern of pilot symbols as the N transmitting antennas where N≧2, but offset in at least one of time and frequency.

In some embodiments, the method further comprises transmitting the pilot symbols with a power level greater than a power level of data symbols, depending upon a value reflective of channel conditions.

In some embodiments, adjacent telecommunication cells have different frequency-hopping sequences.

In some embodiments, the method further comprises: encoding pilot symbols using a particular form of pre-processing; transmitting information identifying the particular form of pre-processing used to encode the pilot symbols.

According to a second aspect of the invention, there is provided an OFDM transmitter comprising: a plurality of transmit antennas; an encoder adapted to insert data symbols in an identical frequency-hopping pattern in time-frequency for each of the plurality of antennas; a pilot inserter adapted to insert pilot symbols in a respective pattern in time-frequency for each of the antennas, wherein the pilot symbols for each antenna are inserted such that pilot symbols from other antennas do not occupy the same location in time-frequency.

In some embodiments, the OFDM transmitter is further adapted to: encode pilot symbols using a particular form of pre-processing; transmit information identifying the particular form of pre-processing used to encode the pilot symbols.

In some embodiments, the OFDM transmitter is further adapted to transmit the pilot symbols with a power level that is dynamically adjusted to ensure sufficiently accurate reception.

According to a third aspect of the invention, there is provided a receiver comprising: a plurality of transmit antennas for receiving OFDM symbols including pilot symbols in a respective pattern in time-frequency and data symbols in an identical frequency-hopping pattern in time-frequency, the pilot symbols for each respective pattern in time-frequency inserted such that pilot symbols from different antennas do not occupy the same location in time-frequency and information identifying a particular form of pre-processing used to encode the received pilot symbols from at least one source; differentiating pilot logic adapted to utilize the information identifying the particular form of pre-processing used to encode the received pilot symbols to differentiate between received pilot symbols from different sources occurring at a same time-frequency location.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

The invention will now be described in greater detail with reference to the accompanying Figures, in which:

FIG. 12B is a time-frequency plot showing data mapping for transmission on downlink antennas using a MIMO OFDM scheme according to a particular type of data coding;

DETAILED DESCRIPTION OF THE PREFERRED EMBODIMENTS

The following sections describe a MIMO-OFDM transmitter/receiver and scattered pilot insertion. By way of introduction, an OFDM frame consists of the preamble OFDM symbols and regular OFDM symbols. Each OFDM symbol uses a set of orthogonal sub-carriers. When there are two transmit antennas, two OFDM symbols form a STTD block. For regular OFDM symbols, some sub-carriers are used as pilot sub-carriers to carry pilot symbols while the others are used as data sub-carriers to carry data symbols. The pilot sub-carriers are modulated by pilot symbols generated by QPSK. The data sub-carriers are modulated by complex data symbols generated by QAM mapping. STTD coding is applied to the pilot sub-carrier pairs located at the same frequency within one STTD block.

Figure 1A:
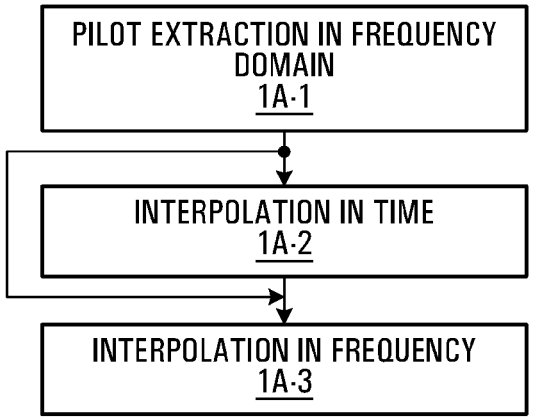
FIG. 1A illustrates a flow-chart of an example of conventional OFDM Channel Estimation.
Figure 1B:
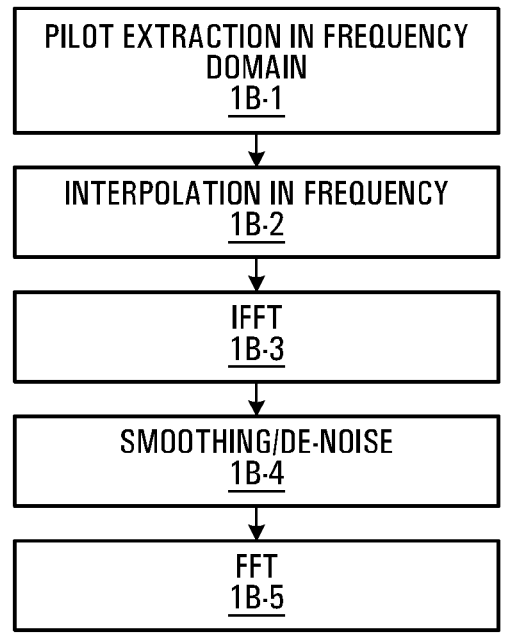
FIG. 1B illustrates a flow-chart of another example of conventional OFDM Channel Estimation.
Figure 1C:
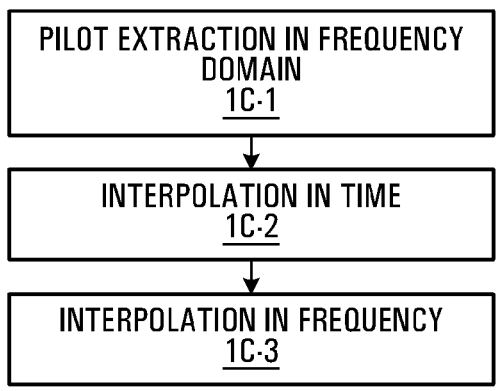
FIG. 1C illustrates a flow-chart of another example of conventional OFDM Channel Estimation.
Figure 2:
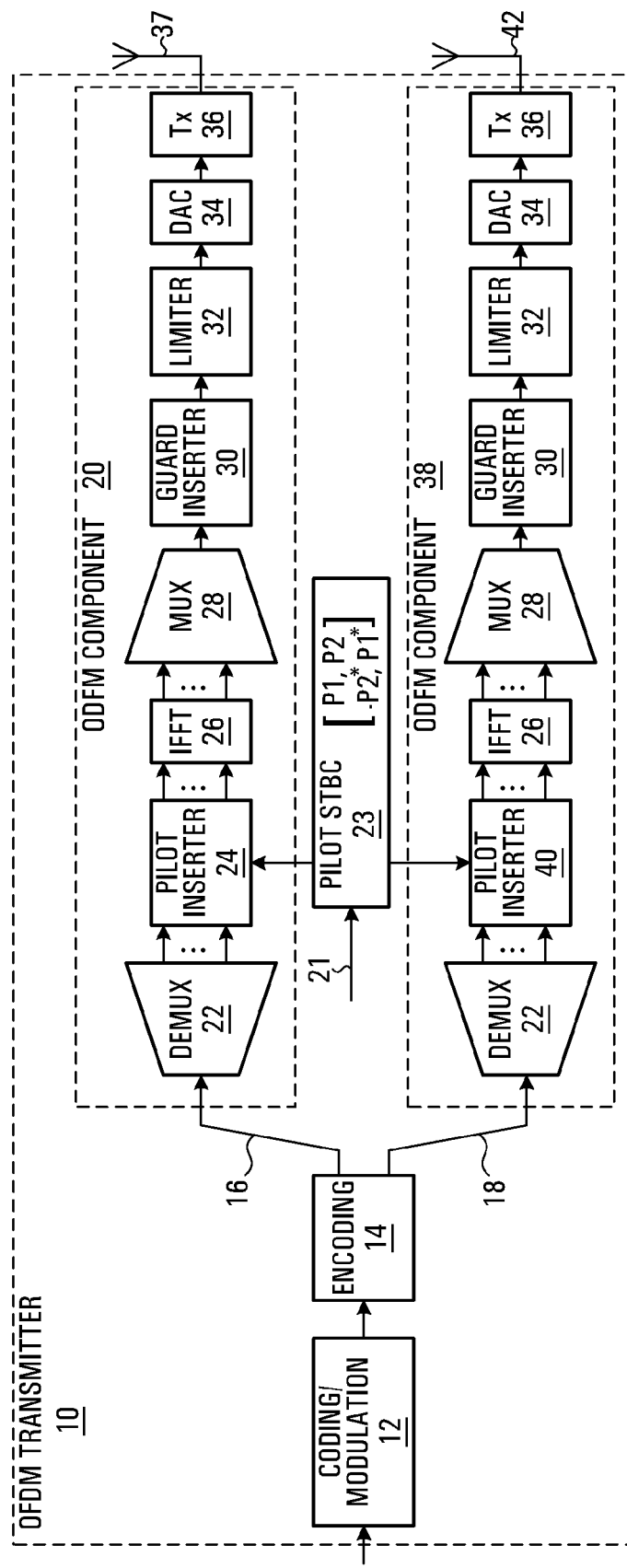
FIG. 2 is a block diagram of a Multiple-Input Multiple-Output (MIMO) Orthogonal Frequency Division Multiplexing (OFDM) transmitter provided by an embodiment of the invention.

Referring to FIG. 2, a block diagram of a Multiple-Input Multiple-Output (MIMO) Orthogonal Frequency Division Multiplexing (OFDM) transmitter provided by an embodiment of the invention is shown. The OFDM transmitter shown in FIG. 2 is a two-output OFDM transmitter, though more generally there may be a plurality of M transmitting antennae. An OFDM transmitter 10 takes binary data as input but data in other forms may be accommodated. The binary data is passed to a coding/modulation primitive 12 responsible for encoding, interleaving, and modulating the binary data to generate data symbols, as is well known to those skilled in the art. The coding/modulation primitive 12 may include a number of processing blocks, not shown in FIG. 2. An encoder 14 applies Space-Time Block Coding (SBTC) to the data symbols. The encoder 14 also separates the data symbols into a first processing path 16 and a second processing path 18, by sending alternate data symbols along each of the two processing paths. In the more general case in which the OFDM transmitter 10 includes M transmitting antennae, the encoder 14 separates the data symbols into M processing paths.

The data symbols sent along the first processing path 16 are sent to a first OFDM component 20. The data symbols are first passed to a demultiplexer 22 in the first OFDM component 20, after which the data symbols are treated as sub-carrier components. The data symbols are then sent to a pilot inserter 24, where pilot symbols are inserted among the data symbols. Collectively, the data symbols and pilot symbols are referred to hereinafter simply as symbols. The symbols are passed to an Inverse Fast Fourier Transform (IFFT) processor 26, then to a multiplexer 28 where they are recombined into a serial stream. A guard inserter 30 adds prefixes to the symbols. Finally, the OFDM signals are passed through a hard limiter 32, a digital-to-analog converter 34, and a radio frequency (RF) transmitter 36 which transmits OFDM symbols as a signal through a first transmitting antenna 37. In most embodiments, each element in the first OFDM component 20 is a processor, a component of a larger processor, or a collection of processors or any suitable combination of hardware, firmware and software. These might include general purpose processors, ASICs, FPGAs, DSPs to name a few examples.

The pilot inserter 24 is connected to receive space-time coded pilot symbols from pilot STBC function 23 which performs STBC on pilot symbols 21. The pilot STBC block 23 takes two pilot symbols at a time for example $P_1$ and $P_2$ as indicated in FIG. 2 and generates an STBC block consisting of a two by two matrix having $(P_1, P_2)$ in the first row and having $(-P_2^*, P_1^*)$ in the second row. It is the first row of this STBC block that is inserted by the pilot inserter 24.

The data symbols sent along the second processing path 18 are sent to a second OFDM component 38 which includes processors similar to those included in the first OFDM component 20. However, the pilot inserter 40 inserts encoded pilot symbols from the second row of the STBC block produced by the pilot STBC function 23. The symbols sent along the second processing path 18 are ultimately transmitted as a signal through a second transmitting antenna 42.

Figure 3:
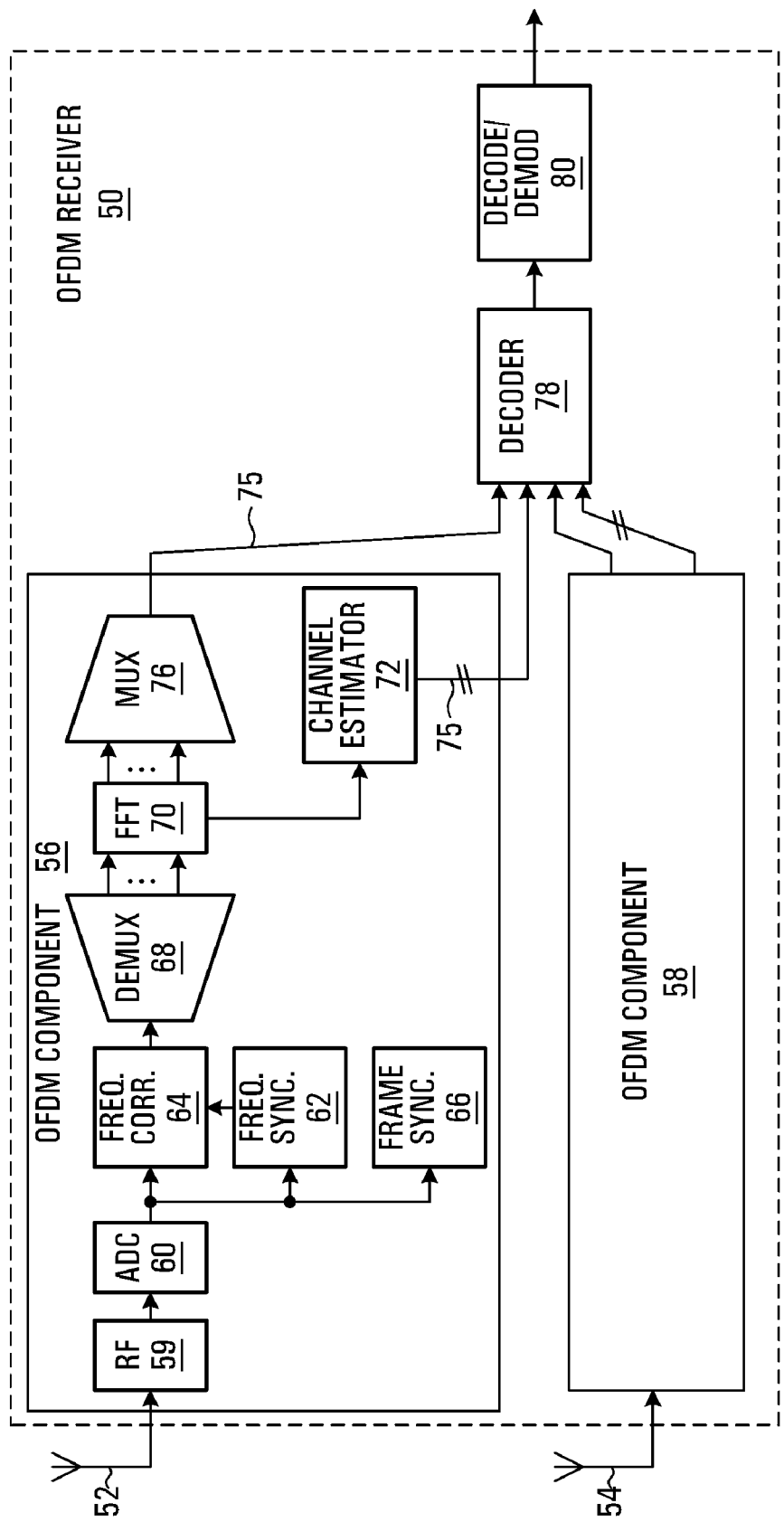
FIG. 3 is a block diagram of an OFDM receiver.

Referring now to FIG. 3, a block diagram of a MIMO-OFDM receiver is shown. An OFDM receiver 50 includes a first receiving antenna 52 and a second receiving antenna 54 (although more generally there will be one or more receiving antennae). The first receiving antenna 52 receives a first received signal. The first received signal is a combination of the two signals transmitted by the two transmitting antennae 37 and 42 of FIG. 2, although each of the two signals will have been altered by a respective channel between the respective transmitting antenna and the first receiving antenna 52. The second receiving antenna 54 receives a second received signal. The second received signal is a combination of the two signals transmitted by the two transmitting antennae 37 and 42 of FIG. 2, although each of the two signals will have been altered by a respective channel between the respective transmitting antenna and the second receiving antenna 54. The four channels (between each of the two transmitting antennae and each of the two receiving antennae) may vary with time and with frequency, and will usually be different from each other.

The OFDM receiver 50 includes a first OFDM component 56 and a second OFDM component 58 (although in general there will be N OFDM components, one for each receiving antenna). The first OFDM component 56 includes a RF receiver 59, and an analog-to-digital converter 60, which converts the first received signal into digital signal samples. The signal samples are passed to a frequency synchronizer 62 and a frequency offset corrector 64. The signal samples are also fed to a frame/time synchronizer 66. Collectively, these three components produce synchronized signal samples.

The synchronized signal samples represent a time sequence of data. The synchronized signal samples are passed to a demultiplexer 68, then passed in parallel to a Fast Fourier Transform (FFT) processor 70. The FFT processor 70 performs an FFT on the signal samples to generate estimated received symbols which are multiplexed in MUX 76 and sent as received symbols to decoder 78. Ideally, the received symbols would be the same as the symbols fed into the IFFT processor 26 at the OFDM transmitter 10. However, as the received signals will have likely been altered by the various propagation channels, the first OFDM component 56 must correct the received symbols by taking into account the channels. The received symbols are passed to a channel estimator 72, which analyses received pilot symbols located at known times and frequencies within the OFDM frame. The channel estimator 72 compares the received pilot symbols with what the channel estimator 72 knows to be the values of the pilot symbols as transmitted by the OFDM transmitter 10, and generates an estimated channel response for each frequency and time within the OFDM symbol. The estimated channel responses are passed to decoder 78. The channel estimator 72 is described in detail below.

The second OFDM component 58 includes similar components as are included in the first OFDM component 56, and processes the second received signal in the same manner as the first OFDM component 56 processes the first received signal. Each OFDM component passes OFDM symbols to the decoder 78.

The decoder 78 applies STBC decoding to the OFDM symbols, and passes the symbols to a decoding/demodulating primitive 80 responsible for decoding, de-interleaving, and demodulating the symbols to generate output binary data, as is well known to those skilled in the art. The decoding/demodulation primitive 80 which may include a number of additional processing blocks, not shown in FIG. 2. Each element in the OFDM components 56 and 58 is a processor, a component of a larger processor, or a collection of processors.

Figure 4:
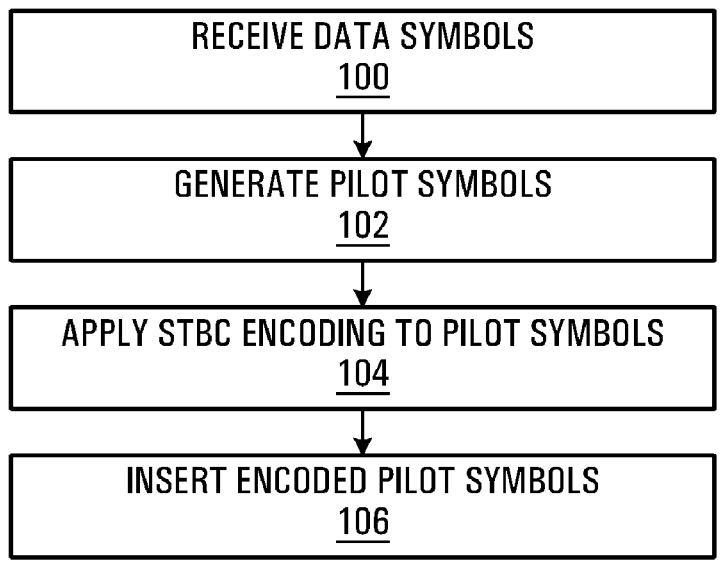
FIG. 4 is a flowchart of a method by which an OFDM transmitter inserts pilot symbols into an OFDM frame according to one embodiment of the invention.

Referring now to FIG. 4, a method by which each of the pilot inserters 24 and 40 of FIG. 2 inserts pilot symbols among the data symbols is shown. The method will be described with reference to the pilot inserter 24 in the first OFDM component 20. At step 100, the pilot inserter 24 receives data symbols from the demultiplexer 22. At step 102 the pilot STBC function 23 generates (or receives) two pilot symbols. At step 104 the pilot STBC function 23 applies STBC encoding to the pilot symbols, so as to generate an STBC block of encoded pilot symbols. The encoded pilot symbols generated for the first transmitting antenna 37 will be one row of the STBC block and will have a number equal to the number of transmitting antennae in the OFDM transmitter. Thus, for a two antenna system a 2×2 STBC block is generated.

At step 106 the pilot inserter 24 inserts the encoded pilot symbols within the OFDM symbol. Encoded pilot symbols are inserted in a diamond lattice pattern. The diamond lattice pattern uses the same frequencies as the other diamond lattice patterns, but has a temporal offset from the other diamond lattice patterns. Preferably, the temporal offset for each diamond lattice pattern is one symbol (in the time direction) from another diamond lattice pattern, so that the diamond lattice patterns use consecutive symbols in the time direction of the OFDM frame.

The diamond lattice pattern in which each encoded pilot symbol is inserted within the OFDM frame is preferably a perfect diamond lattice pattern. To achieve this, the encoded pilot symbol is inserted at each of a first subset of frequencies. The frequencies within the first subset of frequencies are spaced equally apart by a pilot spacing. The encoded pilot symbol is inserted at each of the first subset of frequencies for an STBC block (two OFDM symbols). At some later time, the encoded pilot symbols are inserted at each of a second subset of frequencies. The frequencies within the second subset of frequencies are shifted from the frequencies within the first subset of frequencies by half of the pilot spacing within the frequency direction. The pilot inserter 24 continues to insert encoded pilot symbols, alternating between the first subset of frequencies and the second subset of frequencies.

Alternatively, a different pilot pattern can be used, as long as the same pilot pattern is used for each of the at least one encoded pilot symbols unique to the transmitting antenna 37, and as long as the pilot patterns for the encoded pilot symbols are offset from each other in the time direction of the OFDM frame. For example, a regular diagonal lattice pattern may be used, the diamond shaped lattice being a special case of this.

The pilot inserter 40 inserts pilot symbols using the same method, although the pilot symbols will be the other half of the STBC block 42. The encoded pilot symbols unique to the second transmitting antenna 42 are inserted in the OFDM frame at the same symbol locations at which the encoded pilot symbols corresponding to the first transmitting antenna 37 are inserted.

Figure 5:
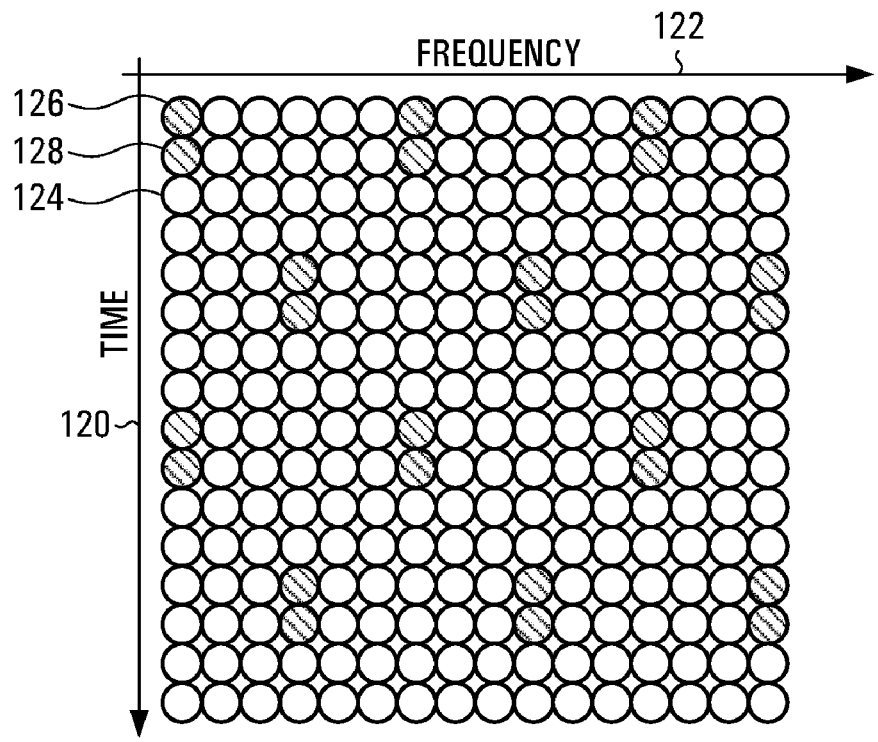
FIG. 5 is a diagram of a pilot pattern generated using the method of FIG. 4.

Referring to FIG. 5, an example pilot pattern generated using the method of FIG. 4 is shown. Pilot and data symbols are spread over the OFDM frame in a time direction 120 and a frequency direction 122. Most symbols within the OFDM frame are data symbols 124. A first set of encoded pilot symbols 126 corresponding to the first transmitting antenna 37 is inserted in a diamond lattice pattern. A second set of encoded pilot symbols 128 corresponding to the first transmitting antenna 37 is inserted in a diamond lattice structure at the same frequencies as the first set of encoded pilot symbols, but offset by one OFDM symbol location in the time direction 120. In the illustrated example two of every four OFDM symbols carry encoded pilot symbols. Each other transmitting antenna transmits using the same pattern. The pairs of consecutive pilot symbols on a sub-carrier consist of two raw pilot symbols STBC encoded. The same pattern is transmitted by the second antenna.

The power of the encoded pilot symbols 126, 128 may be increased compared to the traffic data symbol 124. The power increase of the encoded pilot can be dynamically adjusted with respect to the transmitting data symbol power level or modulation type (QAM size), or as a function of channel quality. The location of diamond lattice pattern may also be optimized to allow a fast extraction of scattered pilot without using the computing. This may be achieved if the pilot sub-carriers are spaced in the frequency direction by $2^n$. In the multiple base station transmission arrangement, the location of the diamond lattice pattern can be cyclic offset both in time direction and in frequency direction amongst adjacent base stations to form a diamond lattice re-use pattern.

Figure 6:
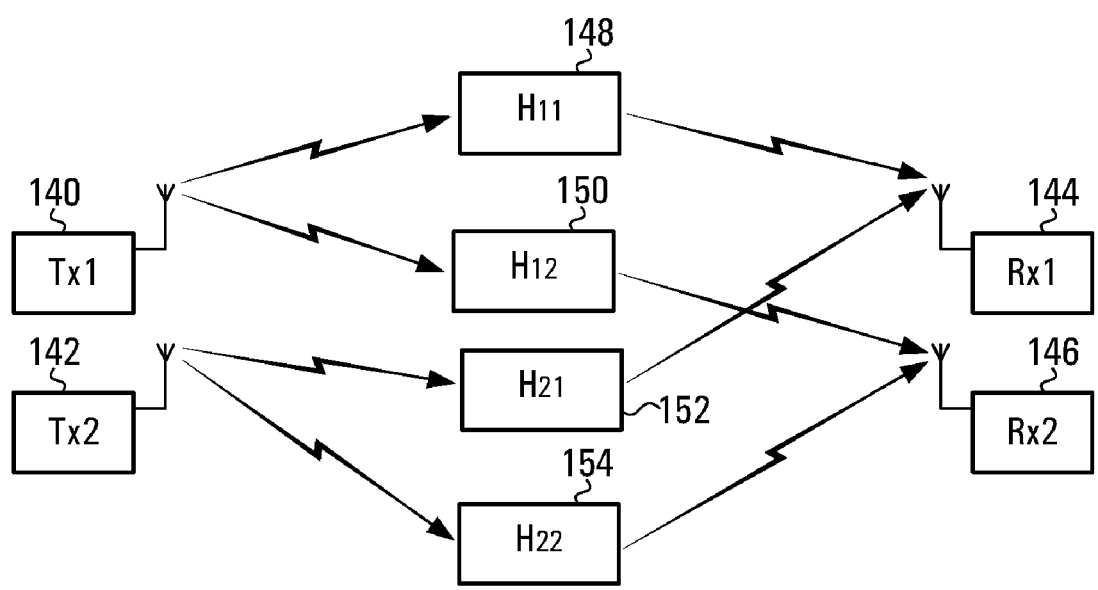
FIG. 6 is a block diagram of a MIMO system showing the channel transfer functions between two transmit antennas and two receive antennas.

Referring now to FIGS. 6 to 10, a channel estimation method is described which is based on the pilot insertion method above. This invention presents a simple 2-dimensional channel interpolator for MIMO-OFDM system with low pilot density for fast fading channels both in time and in frequency. The goal of channel estimation is to estimate the channel characteristics for each sub-carrier and at each time for each possible transmit antenna, receive antenna combination. Referring to FIG. 6, for the two transmit antenna, two receive antenna example, shown are two transmit antennas Tx1 140 and Tx2 142 and two receive antennas Rx1 144 and Rx2 146. Channel estimation estimates a channel for each sub-carrier and at each time between Tx1 140 and Rx1 144 indicated as each $H_{11}$ 148, a channel between Tx1 140 and Rx2 146 indicated by transfer function $H_{12}$ 150, a channel estimate for transmitter Tx2 142 to Rx1 144 indicated as transfer function $H_{22}$ 152 and finally, a channel estimate for transmitter T×2 142 to receiver R×2 146 indicated as transfer function $H_{21}$ 154.

Some advantages for the proposed method compared to some existing methods are: (1) robust to high mobility-speed (2) a reduction of the scattered pilot grid density and therefore a reduction of the pilot overhead.

Let $P_1$ and $P_2$ be the two pilot symbols encoded in an STBC block and transmitted by two antennas on one sub-carrier in consecutive OFDM symbols. Then at the first receive antenna, the following relationship exists for each sub-carrier on which pilot symbols are transmitted, where it is assumed the channel response $H_{ij}$ is constant over two OFDM frames:

$$\begin{bmatrix} Y_{1,1} \\ Y_{1,2} \end{bmatrix} = \begin{bmatrix} P_1 & P_2 \\ -P_2^* & P_1^* \end{bmatrix} \begin{bmatrix} H_{11} \\ H_{21} \end{bmatrix}$$

$Y_{1,1}$ is the received data on the first antenna on the sub-carrier in the first of the two consecutive OFDM symbols, and $Y_{1,2}$ is the received data on the first antenna on the sub-carrier in the second of the two consecutive symbols. This can be solved for $H_{11}$, $H_{21}$ to yield:

$$\begin{bmatrix} H_{11} \\ H_{21} \end{bmatrix} = \frac{1}{|P_1|^2 + |P_2|^2} \begin{bmatrix} P_1^* & -P_2 \\ P_2^* & P_1 \end{bmatrix} \begin{bmatrix} Y_{1,1} \\ Y_{1,2} \end{bmatrix}$$

A similar process for the second antenna yields $$\begin{bmatrix} H_{12} \\ H_{22} \end{bmatrix} = \frac{1}{|P_1|^2 + |P_2|^2} \begin{bmatrix} P_1^* & -P_2 \\ P_2^* & P_1 \end{bmatrix} \begin{bmatrix} Y_{2,1} \\ Y_{2,2} \end{bmatrix}$$

where $Y_{2,1}$ is the received data on the second antenna on the sub-carrier in the first of the two consecutive OFDM symbols, and $Y_{2,2}$ is the received data on the second antenna on the sub-carrier in the second of the two consecutive OFDM symbols.

Using this technique, a channel estimate is made for each pilot sub-carrier, and for each pair of OFDM symbols used to transmit STBC blocks.

Figure 7:
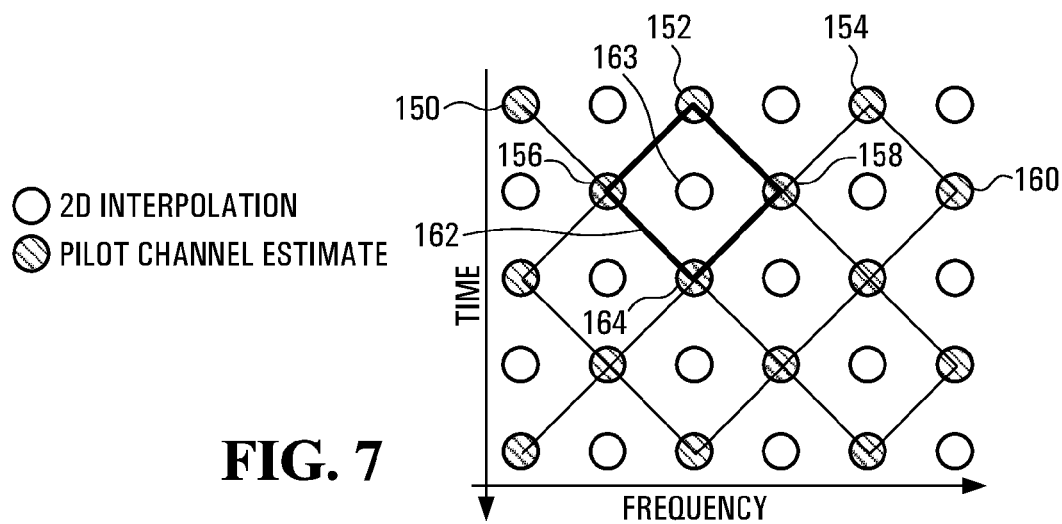
FIG. 7 is a time frequency diagram showing channel estimate positions for pilot channel estimation.
Figure 8:
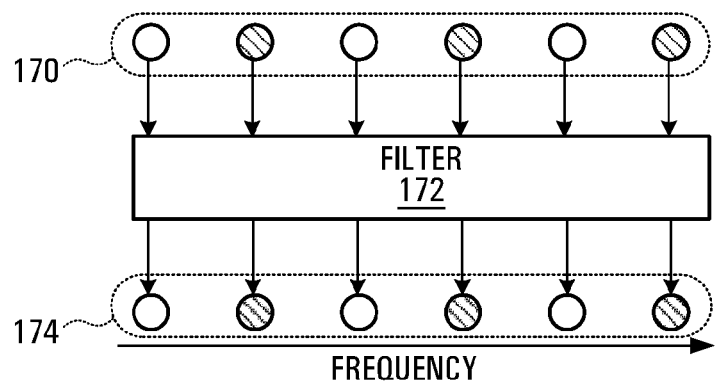
FIG. 8 schematically illustrates a step of filtering estimated and interpolated pilot channel estimates.

For the example of FIG. 5, the result is a channel estimate, for each of the possible channels (these are for channels in this example as shown in FIG. 6) for each pair of pilot symbols transmitted. This is illustrated in FIG. 7 where only sub-carriers used to transmit pilots are shown. A channel estimate 150 is generated for each pair of (consecutive in time) OFDM frames for each pilot sub-carrier. This results in channel estimates 150, 152, 154 for the first and second frames, and channel estimates 156, 158, 160 for the fifth and sixth frames and so on.

The channel estimates are made on a STBC block by block basis so that the pattern of channel estimate shown in FIG. 7 develops over time. The next step in the process is to perform an interpolation based on the channel estimate of FIG. 7 to obtain channel estimates for the places in FIG. 7 which do not represent pilot channel positions. The manner in which this is done will be described for a single example, namely the unknown channel estimate indicated at 163 of FIG. 7. Channel estimates are buffered on an ongoing basis and when the four channel estimates 152, 156, 158 and 164 forming a diamond 162 surrounding the unknown channel estimate 163 have been computed, it is time to interpolate to obtain a channel estimate for the unknown point 163. The channel transfer function at the sub-carrier located at the centre of the diamond can be obtained from a simple 4 points two-dimensional interpolator. Three points two-dimensional interpolators can be used to obtain the channel estimates corresponding to the first or last useful sub-carrier:

$$H_{new}(n+1, k) = \frac{1}{4}(H(n, k) + H(n+2, k) + H(n+1, k-1) + H(n+1, k+1))$$

where ($k=2, \ldots, N_{pilot}-1$)

$$H_{new}(n+1, 1) = \frac{1}{4}(H(n, 1) + H(n+2, 1) + 2H(n+1, 2))$$

$$H_{new}(n+1, N_{pilot}) = \frac{1}{4}(H(n, N_{pilot}) + H(n+2, N_{pilot}) + 2H(n, N_{pilot}-1))$$

where k is the pilot sub-carrier index, n is the channel estimate index (or STBC block number—one channel estimate per sub-carrier for every two symbols), and $N_{pilot}$ is the number of pilot sub-carriers (6 in the example of FIG. 7). $H_{new}$ is the newly interpolated channel estimate for the $i^{th}$ channel estimation period, and the $j^{th}$ pilot sub-carrier. $H(i, j)$ is the channel estimate determined as described previously from the pilot symbols. A three points interpolator would also be performed for the last STBC blocks in the OFDM frame (i.e. the last two OFDM symbols).

These calculations are done for each transmit antenna, receiver antenna combination. It is noted that this is just one example of how the channel estimates can be interpolated.

If the original distance between pilot sub-carriers in the frequency direction is $D_f$, after first step of interpolation described above, the pilot sub-carriers' separation becomes $$\frac{D_f}{2}.$$

In some embodiments, to remove noise, the channel estimates thus computed are filtered at each channel estimation period. This is shown in FIG. 6 where the channel estimates 170 for one channel estimation period are shown entering filter 172 to produce filtered channel estimates. For example, a simple 3 point moving iterative smoothing algorithm may be applied to H':

$$H'_{sm}(n, k) = H'_{sm}(n, k-1) + \frac{1}{3}(H'(n, k+1) + H'_{sm}(n, k-2))$$

where $k=3, \ldots, 2N_{pilot}-2$. It is to be understood that other filtering algorithms may be employed.

After the interpolation of the pilot channel estimate as summarized in FIG. 7, there will be a channel estimate for each sub-carrier on which pilot channel information was transmitted and for each two OFDM symbol period over which pilot channelling information was transmitted. Referring to FIG. 5, this means that there will be a channel estimate for each antenna for time frequency points which are shaded to indicate that pilot channel information was transmitted.

There will also be channel estimates for the time frequency point in the centre of the diamond shaped lattice structure of FIG. 7. However, for points which are not pilot symbol transmission time-frequency points nor points which are at the centre of a diamond shaped lattice of such points, there will be no channel estimate yet computed. The next step is to perform a further interpolation step to develop channel estimates for these other points.

In some embodiments, Cubic Lagrange interpolation and linear interpolation (for the sub-carriers near the first and the last useful sub-carrier) in the frequency direction are used to obtain the channel transfer function at all sub-carriers for each STBC block (for each pair of OFDM symbols).

The coefficients of the Cubic Lagrange interpolator can be calculated as $$\mu(i) = \frac{i}{D_f/2} \quad i = 1, 2, \ldots, \frac{D_f}{2}$$

$$q_{-1}(\mu) = -\frac{1}{6}\mu^3 + \frac{1}{2}\mu^2 - \frac{1}{3}\mu$$

$$q_0(\mu) = \frac{1}{2}\mu^3 - \mu^2 - \frac{1}{2}\mu + 1$$

$$q_1(\mu) = -\frac{1}{2}\mu^3 + \frac{1}{2}\mu^2 + \mu$$

$$q_2(\mu) = -\frac{1}{6}\mu^3 - \frac{1}{6}\mu$$

The channel transfer functions at data sub-carriers are given by $$H_{interp}\left((j-1) \cdot \frac{D_f}{2} + i\right) = \sum_{n=-1}^{2} q_n(\mu(i)) \cdot H'_{sm}(j+n)$$

where $j=2, \ldots, N_{pilot}-2$.

Figure 9:
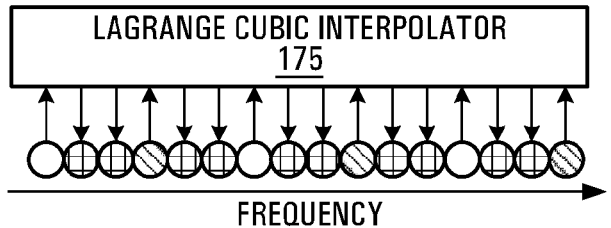
FIG. 9 shows schematically the step of interpolating between the channel estimates previously determined to provide channel estimates for all sub-carriers and all times.

This is illustrated in FIG. 9 where the estimated channel responses are fed to the Legrange cubic interpolator function 175 which outputs values for all intermediate sub-carriers. Other interpolations may alternatively be employed.

In some embodiments, every OFDM symbol contains some pilot insertion points and as such this completes the interpolation process. In other embodiments, there are some OFDM symbols which do not have any pilot insertion points. To get channel estimates for these OFDM symbols, an interpolation in time of the previously computed channel estimates is performed. In high mobility applications, pilots should be included in every OFDM symbol avoiding the need for this last interpolation in time step.

Figure 10:
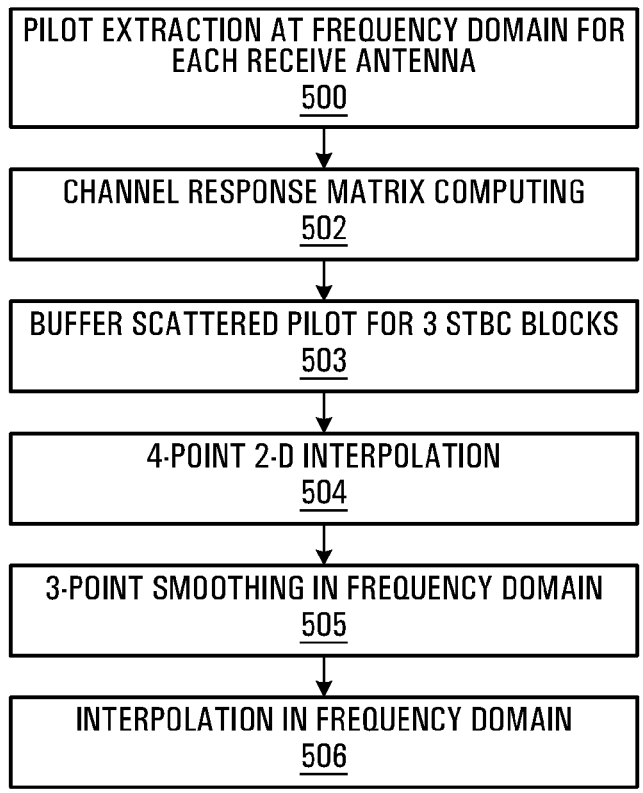
FIG. 10 is a flow chart summarizing the overall channel estimation method provided by an embodiment of the invention.

FIG. 10 presents an overall block diagram of the interpolation method proposed for two transmit antennas. An example set of performance results for the proposed MIMO-OFDM channel estimation algorithm is shown in FIG. 10. The performance of the 2-D channel estimation algorithm is close to the performance of ideal channel (only 0.5 dB loss) at very high Doppler spread.

Referring now to FIGS. 10 and 3, the channel estimation method is carried out by the channel estimator 72 in order to estimate a channel response for each sub-carrier and each OFDM symbol within an OFDM frame. The channel estimation method starts at step 500 by extracting the pilot symbols in the frequency domain for each receive antenna. This is followed by a channel response matrix computing step 502; whereby the received signal received by the receiving antenna is decoded, which in effect performs a time average of the encoded pilot symbols at each point in the pilot pattern. For example, suppose the receiving antenna receives an OFDM frame having a pilot pattern as shown in FIG. 5 (although the symbol 126 will now be a linear combination of the encoded pilot symbol transmitted at this location by each of the transmitting antenna, and the symbol 128 will be a linear combination of the encoded pilot symbol transmitted at this location by each of the transmitting antenna). Following decoding, the pilot symbol at symbol location 126 will be an average of the pilot symbol received at symbol location 126 and the pilot symbol received at symbol location 128. The time averaging effect produced by the STBC decoding, during step 503, can be viewed as a pre-processing step, as can steps 500 and 502. The actual channel estimation method can be described broadly in four steps. Following step 503, during step 504 the channel estimator 72 estimates the channel response for each of a plurality of pilot symbols. For a diamond lattice pattern, the plurality of pilot symbols will be four pilot symbols forming a single diamond pattern. The channel estimator 72 estimates the channel response of a central symbol, the central symbol having a time direction value and a frequency direction value bounded by the time direction values and the frequency direction values of the plurality of pilot symbols. The central symbol preferably has a frequency direction value equal to the frequency direction values of two of the plurality of pilot symbols, and has a time direction value midway between the time direction values of the two pilot symbols having the same frequency direction value as the central symbol. This can generally be described as a four-point 2-D interpolation of the channel response between pilot symbols. Third, the channel estimator 72 smoothes the channel responses (corresponding to both encoded pilot symbols and to the central symbol) in the frequency direction, preferably by performing a three-point smoothing, as per step 505. Fourth, the channel estimator 72 performs an interpolation in the frequency direction to estimate the channel response for remaining symbols, as per step 506. The interpolation may be a linear interpolation for symbols having a frequency direction value equal to a first or a last useful sub-carrier within the OFDM symbol, and a cubic Lagrange interpolation otherwise.

The method of inserting pilot symbols (described above with reference to FIG. 4) and the channel estimation method (described above with reference to FIG. 10) need not be used together. Any channel estimation method may be used by the OFDM receiver to estimate the channel responses for an OFDM frame containing encoded pilot symbols inserted using the method described above. However, due to the sparse distribution of the pilot symbols in the pilot pattern described above with reference to FIG. 4 and FIG. 5, a two-dimensional interpolation method is preferable over a one-dimensional interpolation method. Similarly, the channel estimation method may be applied to an OFDM frame containing any pattern of pilot symbols.

The invention has been described with respect to a MIMO-OFDM communication system. The invention may also be used with advantage in a single input-multiple output OFDM communication system, as the method of inserting pilot symbols (described with reference to FIG. 4) and the channel estimation method (described with reference to FIG. 10) do not depend on the number of receiving antenna. Each receiving antenna within the OFDM receiver 50 performs channel estimation independently, regardless of the number of receiving antennae present.

Figure 11:
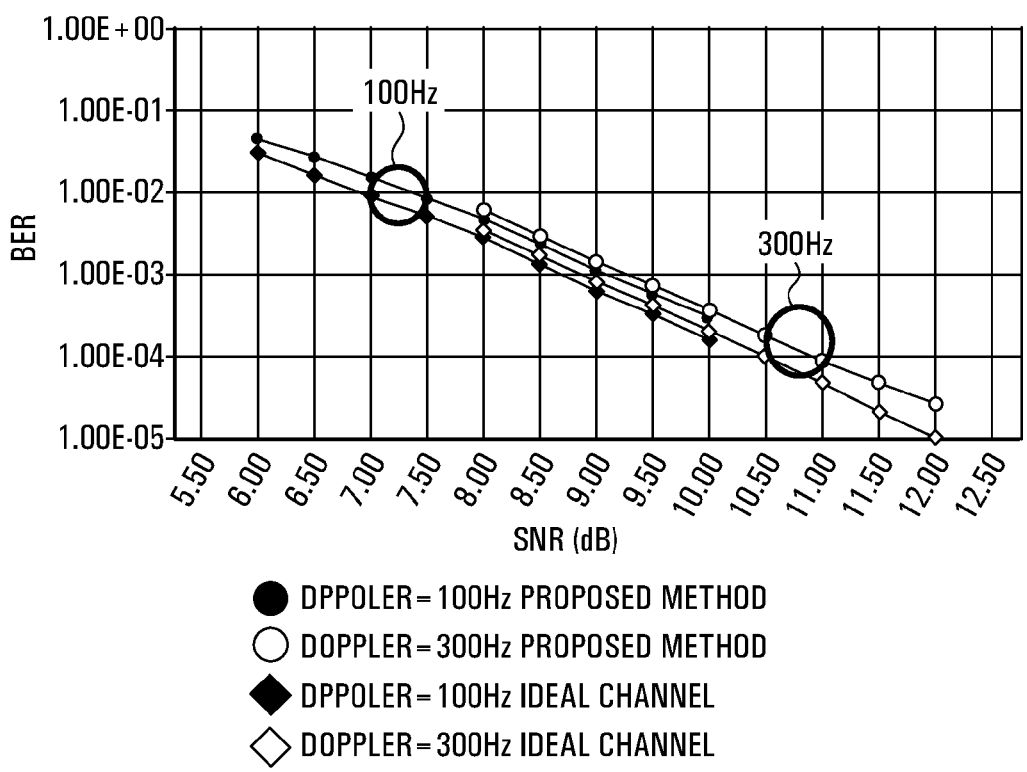
FIG. 11 is an example of a set of performance results obtained using the method of FIG. 10.

The channel estimation method described with reference to FIG. 10 will also be advantageous in an OFDM communication system having only one transmitting antenna, as the method provides an improved interpolation of the channel response regardless of the number of transmitting antenna. The method of inserting pilot symbols described with reference to FIG. 11 may be used in an OFDM communication system having only one transmitting antenna, but will not be as advantageous as in an OFDM communication system having more than one transmitting antenna as there will be no reduction in overhead.

The method of inserting pilot symbols and the channel estimation method are preferably implemented on the OFDM transmitter and on the OFDM receiver respectively in the form of software instructions readable by a digital signal processor. Alternatively, the methods may be implemented as logic circuitry within an integrated circuit. More generally, any computing apparatus containing logic for executing the described functionality may implement the methods. The computing apparatus which implements the methods (in particular the pilot inserter or the channel estimator) may be a single processor, more than one processor, or a component of a larger processor. The logic may comprise external instructions stored on a computer-readable medium, or may comprise internal circuitry.

FIGS. 12-17 illustrate various embodiments of the present invention. These embodiments provide schemes for data mapping on downlink (DL) and uplink (UL) transmission antennas. A DL transmission is a transmission over a transmission resource from a base station to one or more mobile stations. A UL transmission is a transmission over a transmission resource from one or more mobile stations to a base station. In some embodiments, a transmission resource is a plurality of OFDM symbols transmitted on a plurality of OFDM subcarriers. In some embodiments a signal processing scheme is used that supports high data rates at very low packet and delay losses, also known as latencies, over a distributed IP wireless network. Transmissions that have low-latency enable real-time mobile interactive and multimedia applications. In some embodiments, the signal processing scheme delivers higher quality wireless service and improved cost effectiveness over current wireless data technologies.

In some embodiments the schemes are used for multiple input multiple output (MIMO) OFDM transmission.

Inserting Data Symbols for DL MIMO

Figure 12A:
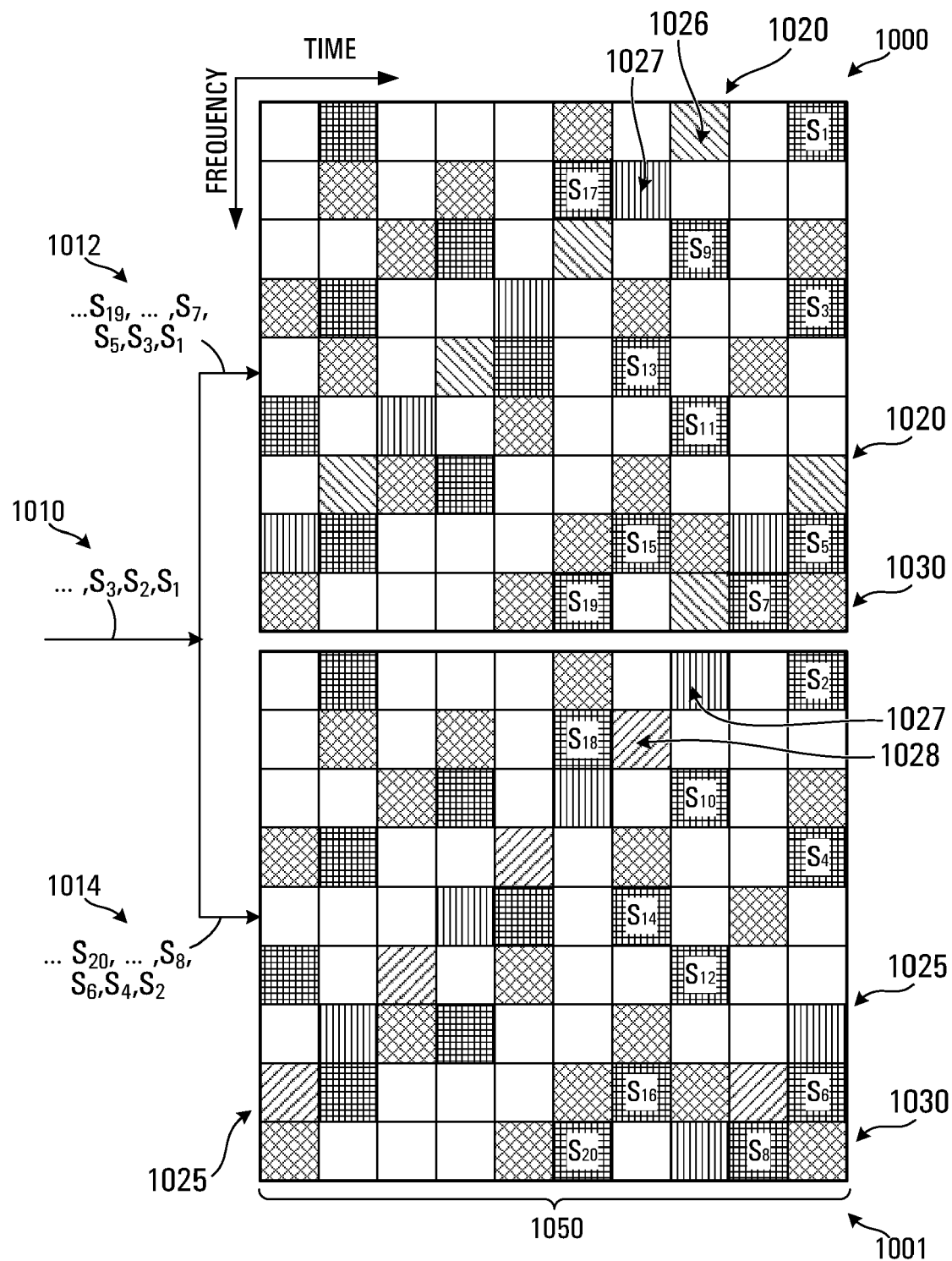
FIG. 12A is a time-frequency plot showing data mapping for transmission on downlink antennas using a MIMO OFDM scheme according to an embodiment of the present invention.

FIG. 12A illustrates first and second time-frequency patterns 1000,1001 for mapping DL data symbols for transmission on two antennas using a MIMO OFDM scheme. For example, pilot pattern 1000 is for transmission on a first antenna and pilot pattern 1001 is for transmission on a second antenna.

The time-frequency patterns 1000,1001 are two dimensional plots in which one dimension is a time direction and the other dimension is a frequency direction. In the frequency direction, each discrete horizontal row represents a single sub-carrier. Each discrete vertical column represents an OFDM symbol. The time-frequency patterns 1000,1001 are shown to be two dimensional plots that are nine sub-carriers by ten OFDM symbols in size.

Employing a particular symbol-by-symbol frequency hopping sequence, data is mapped onto the time-frequency patterns 1000,1001. In a spread-spectrum communications system, the frequency hopping sequence allows for the transmission to move or "hop" among numerous frequencies many times per second. As an example, the transmission may hop among 128 frequencies 1,024 times per second.

Frequency hopping is a variant of spread spectrum that uses a technique that enables coexistence of multiple networks (or other devices) in a same area. An example of frequency hopping is IEEE 802.11 Frequency Hopping PHY, which uses 79 non-overlapping frequency channels with 1 MHz channel spacing. In some implementations frequency hopping enables operation of up to 26 collocated networks, enabling high aggregate throughput. Frequency hopping is resistant to multi-path fading through the inherent frequency diversity mechanism.

An OFDM data symbol stream 1010 is divided into a first data symbol stream 1012 and a second data symbol stream 1014. The first and second data symbol streams 1012,1014 are mapped onto the first and second time-frequency patterns 1000,1001 respectively with an identical hopping sequence. The data symbol stream 1010, which includes data symbols "$S_{20}, \ldots S_2, S_1$", is mapped as follows: odd-numbered symbols of data symbol stream 1010, that is "$S_{19} \ldots S_3, S_1$", are mapped to time-frequency pattern 1000 to be transmitted by a first antenna and even-numbered data symbols of data symbol stream 1010, that is "$S_{20} \ldots S_4, S_2$", are mapped to time-frequency pattern 1001 to be transmitted by a second antenna. Odd-numbered symbols in the first time-frequency pattern 1000 are plotted in corresponding locations to even-numbered symbols on the second time-frequency pattern 1001. For example, odd-numbered symbol $S_1$ in the first time-frequency pattern 1000 is located at the same location in time-frequency pattern 1000 as even-numbered symbol $S_2$ in the second time-frequency pattern 1001. Other pairs of odd/even-numbered data symbols are similarly distributed throughout the time-frequency patterns 1000 and 1001 according to the hopping sequence.

FIG. 12A illustrates data symbol stream 1010 divided into odd and even-numbered symbols, but more generally the data symbol stream 1010 can be divided in any manner that results in a first data symbol stream and a second data symbol stream. For example, the data symbol stream may be divided into first and second data symbol streams of pairs of symbols, as opposed to dividing the data stream into individual odd and even symbols on first and second respective data symbol streams.

In some embodiments, a frequency hopping pattern for data symbols, in which the frequency of a data symbol stream hops every OFDM symbol, is created by inserting one or more data symbols from the data symbol stream for transmission to one or more mobile stations on one or more subcarriers of an allocated transmission bandwidth that are all different from the subcarriers used by the same data symbol stream for transmission to a same one or more mobile stations in a previous hop. This is the case for the example of FIG. 12A where during the sixth OFDM symbol for example, $S_{17}$ and $S_{19}$ of data stream 1012 are transmitted on the second and ninth subcarriers. During the seventh OFDM symbol, $S_{13}$ and $S_{15}$ are transmitted on the fifth and seventh subcarriers, none of which are the same as were used during the sixth OFDM symbol.

The illustrative example of FIG. 12A shows frequency hopping for each OFDM symbol duration. In some embodiments frequency hopping occurs after a group of OFDM symbols, where a group is at least two symbols.

One of ordinary skill in the art will recognize that FIG. 12A shows only 20 data symbols in the data stream 1010 for illustrative purposes only. Depending on the size of the data symbol stream, the time-frequency patterns 1000,1001 can include additional or fewer data symbols than that shown in FIG. 12A. Additionally, the number of transmission antennas is not limited to two antennas as described above; more than two antennas can be employed for transmission of data.

The data symbols are modulated onto a specific hopping sequence for transmission to at least one mobile station. Different transmission frequencies or subcarriers are utilized in each OFDM symbol for transmission to each mobile station. The two time-frequency patterns 1000, 1001 of FIG. 12A illustrate the location of data symbols ". . . $S_{20}$, . . . , $S_2$, $S_1$" 1010 transmitted on two respective antennas. Another set of data symbols occupying locations in time-frequency corresponding to symbol locations in the time-frequency patterns 1000,1001 is indicated generally by the cross hatch pattern identified by reference character 1030. The set of data symbols 1030 may be transmitted by one or more antenna that are different than the two respective antennas transmitting time-frequency patterns 1000,1001. In some embodiments, the set of data symbols 1030 is transmitted by antennas belonging to the same base station as the two antennas used to transmit time-frequency patterns 1000,1001. In some embodiments the set of data symbols 1030 represents data symbols transmitted by one or more antennas of a different base station than the base station including the two antennas used to transmit time-frequency patterns 1000,1001. However, the base station used to transmit time-frequency patterns 1000,1001 does not insert data symbols at the locations of the set of data symbols 1030 to avoid interference.

Mobile stations receiving data and pilot symbols know where data and pilot symbols are located in time-frequency based on a particular frequency-hopping pattern for data and particular pilot pattern of which they are aware. In some embodiments, the base station indicates to the mobile station a particular data symbol frequency-hopping pattern and pilot pattern via a control signaling channel. In some embodiments, the mobile station indicates to the base station a particular data symbol frequency hopping pattern and pilot pattern to be used by the base station.

In some embodiments a hopping sequence is periodic having a period defined by a "super slot", generally indicated at 1050. The number of OFDM symbols defines the size of the super slot in the particular frequency hopping sequence. The super slot 1050 of FIG. 12A is shown to have a duration of ten OFDM symbols. More generally, it is to be understood that the duration of the super slot is implementation specific and can be greater than or less than the ten OFDM symbols shown in FIG. 12A. Similarly, the number of subcarriers in the time-frequency patterns 1000,1001 is implementation specific and can be greater than or less than the nine subcarriers that are shown in the illustrated example of FIG. 12A.

In some embodiments, subcarriers in the frequency direction are a set of consecutive subcarriers of an allocated frequency band. In some embodiments, subcarriers in the frequency direction are a set of subcarriers that are not necessarily consecutive, but are a selection of subcarriers grouped together to form a "logical" subband of subcarriers.

In FIG. 12A, the data symbols from data streams 1012, 1014 are inserted in the respective time-frequency patterns 1000,1001 by using an OFDM symbol by OFDM symbol arrangement. For example, in time-frequency pattern 1000, data symbols $s_1$, $s_3$ and $s_5$ are inserted in the tenth OFDM symbol, then data symbol $s_7$ is inserted in the ninth OFDM symbol, then data symbols $s_9$ and $s_{11}$ are inserted in the eighth OFDM symbol, then data symbols $s_{13}$ and $s_{15}$ are inserted in the seventh OFDM symbol, and then data symbols $s_{17}$ and $s_{19}$ are inserted in the sixth OFDM symbol. This is a particular manner for inserting data symbols in the time-frequency patterns, but those skilled in the art will realize that there are various ways that the data symbols could be inserted in the time-frequency patterns. For example, in some embodiments, the data symbols are inserted using a subcarrier by subcarrier arrangement. For example, data symbols are inserted on particular OFDM symbol durations for a first subcarrier, then data symbols are inserted on particular OFDM symbol durations for a second subcarrier, and so on.

FIG. 12A shows only a portion of the time-frequency patterns 1000,1001 filled with symbols to be transmitted from a single data symbol stream 1010. It is to be understood that data symbols can fill some or all of the available symbol slots in the time-frequency pattern after pilot symbols are allocated in the respective time-frequency pattern. For example, there may be multiple data symbol streams in which each stream is divided into a first data symbol stream and a second data symbol stream, and these streams are inserted in locations in the time-frequency patterns 1000,1001 with a given respective hopping sequence. While only a single data symbol stream is shown in FIG. 12A, it is to be understood that the time-frequency patterns can be used for any number of data symbol streams equal to or greater than the one data symbol stream.

In addition to the time-frequency patterns 1000,1001 being used for data, scattered pilot symbols are also transmitted within the same OFDM resource, in a manner that does not conflict with the data transmission. In the illustrated example of FIG. 12A, pilot symbols in each time-frequency pattern 1000,1001 include diagonal arrangements 1020,1025 of alternating pilot symbols 1026,1028 and null symbol locations 1027. The pilot symbols 1026 in time-frequency pattern 1000 are located where null symbol locations 1027 occur in time-frequency pattern 1001 and pilot symbols 1028 in time-frequency pattern 1001 are located where null symbol locations 1027 occur in time-frequency pattern 1000. Pilot symbol patterns for use with MIMO OFDM DL time-frequency patterns will be described in further detail below.

In a particular example of mapping data symbols using a frequency-hopping scheme as described above, pairs of odd and even data symbols are mapped to a set of twenty-four respective subcarriers in a time-frequency pattern for each of two respective antennas. Using a space-time transmit diversity (STTD) coding scheme the mapping of data symbols is as follows:

TABLE 1

STTD coding of data symbols for two antennas

| Subcarrier | Antenna 1 | | Antenna 2 | |
|---|---|---|---|---|
| | Even Symbol | Odd Symbol | Even Symbol | Odd Symbol |
| Subcarrier 0 | $s_0$ | $-s_{24}^*$ | $s_{24}$ | $s_0^*$ |
| Subcarrier 1 | $s_1$ | $-s_{25}^*$ | $s_{25}$ | $s_1^*$ |
| Subcarrier 2 | $s_2$ | $-s_{26}^*$ | $s_{26}$ | $s_2^*$ |
| Subcarrier 3 | $s_3$ | $-s_{27}^*$ | $s_{27}$ | $s_3^*$ |
| Subcarrier 4 | $s_4$ | $-s_{28}^*$ | $s_{28}$ | $s_4^*$ |
| Subcarrier 5 | $s_5$ | $-s_{29}^*$ | $s_{29}$ | $s_5^*$ |
| Subcarrier 6 | $s_6$ | $-s_{30}^*$ | $s_{30}$ | $s_6^*$ |
| Subcarrier 7 | $s_7$ | $-s_{31}^*$ | $s_{31}$ | $s_7^*$ |
| Subcarrier 8 | $s_8$ | $-s_{32}^*$ | $s_{32}$ | $s_8^*$ |
| Subcarrier 9 | $s_9$ | $-s_{33}^*$ | $s_{33}$ | $s_9^*$ |
| Subcarrier 10 | $s_{10}$ | $-s_{34}^*$ | $s_{34}$ | $s_{10}^*$ |
| Subcarrier 11 | $s_{11}$ | $-s_{35}^*$ | $s_{35}$ | $s_{11}^*$ |
| Subcarrier 12 | $s_{12}$ | $-s_{36}^*$ | $s_{36}$ | $s_{12}^*$ |
| Subcarrier 13 | $s_{13}$ | $-s_{37}^*$ | $s_{37}$ | $s_{13}^*$ |
| Subcarrier 14 | $s_{14}$ | $-s_{38}^*$ | $s_{38}$ | $s_{14}^*$ |
| Subcarrier 15 | $s_{15}$ | $-s_{39}^*$ | $s_{39}$ | $s_{15}^*$ |
| Subcarrier 16 | $s_{16}$ | $-s_{40}^*$ | $s_{40}$ | $s_{16}^*$ |
| Subcarrier 17 | $s_{17}$ | $-s_{41}^*$ | $s_{41}$ | $s_{17}^*$ |
| Subcarrier 18 | $s_{18}$ | $-s_{42}^*$ | $s_{42}$ | $s_{18}^*$ |
| Subcarrier 19 | $s_{19}$ | $-s_{43}^*$ | $s_{43}$ | $s_{19}^*$ |
| Subcarrier 20 | $s_{20}$ | $-s_{44}^*$ | $s_{44}$ | $s_{20}^*$ |
| Subcarrier 21 | $s_{21}$ | $-s_{45}^*$ | $s_{45}$ | $s_{21}^*$ |
| Subcarrier 22 | $s_{22}$ | $-s_{46}^*$ | $s_{46}$ | $s_{22}^*$ |
| Subcarrier 23 | $s_{23}$ | $-s_{47}^*$ | $s_{47}$ | $s_{23}^*$ |

Figure 12B:
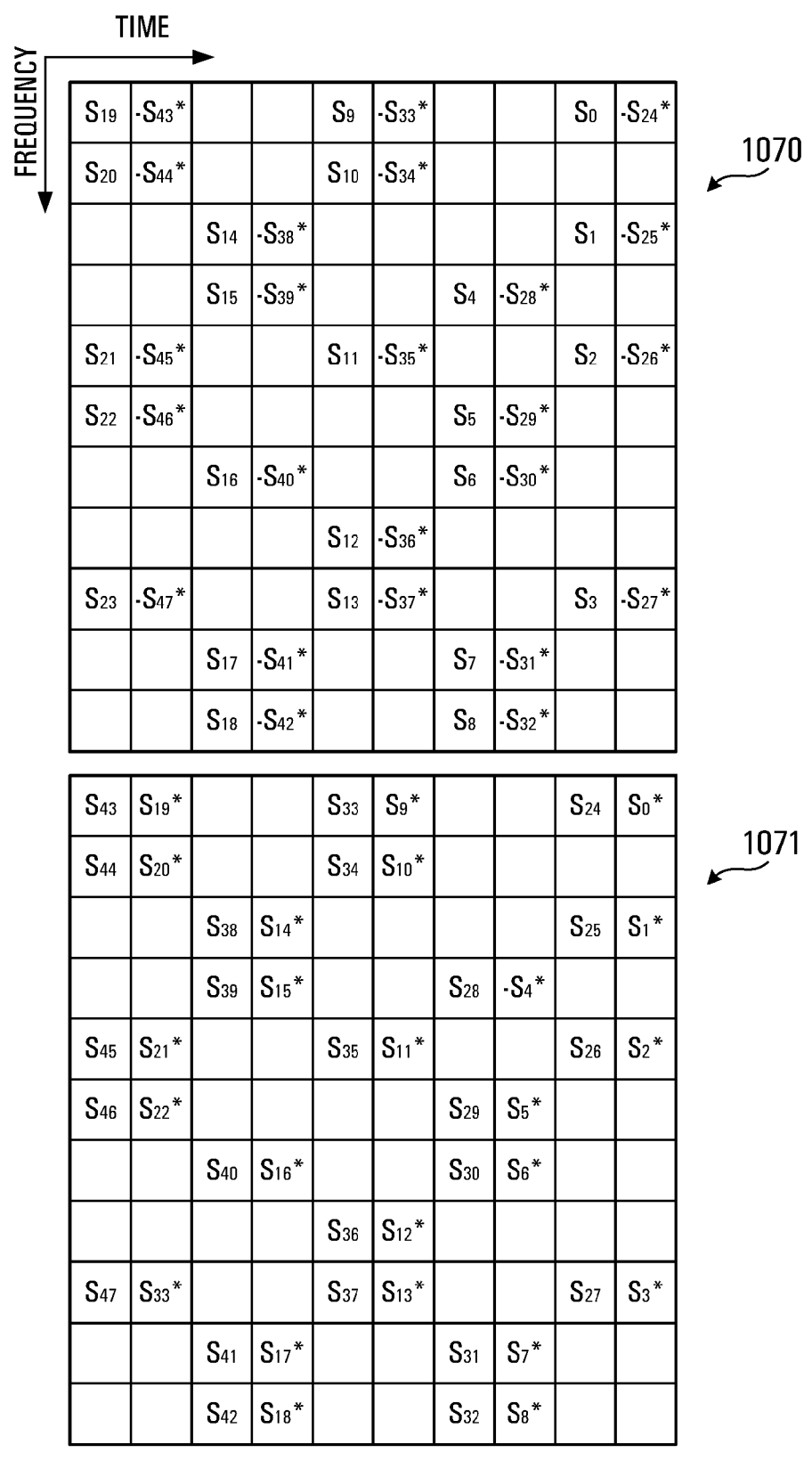

The subcarriers 0-23 in Table 1 above are numbered consecutively, but when the data symbols associated with these respective subcarriers are inserted in time-frequency patterns to be transmitted by two respective antennas, the subcarriers 0-23 correspond to subcarriers allocated to the time-frequency patterns over multiple OFDM symbol durations. FIG. 12B shows illustrates an example of a mapping of the STTD coded data symbols of Table 1 on time-frequency patterns 1070,1071. Time-frequency patterns 1070,1071 have a similar structure to FIG. 12A, but use eleven subcarriers over ten OFDM symbol durations. In time-frequency pattern 1070, the data symbols from subcarriers 0-3 of Table 1 are inserted on subcarriers one, three, five and nine, the data symbols from subcarriers 4-8 of Table 1 are inserted on subcarriers four, six, seven, ten and eleven, and so on. Inserting data symbols in time-frequency pattern 1071 is performed in a similar manner.

In a particular example of mapping data symbols using a frequency-hopping scheme described above, pairs of odd and even data symbols are mapped to a set of twenty-four respective subcarriers in a time-frequency pattern for each of two respective antennas. For a spatial multiplexing (SM) coding scheme the mapping of data symbols is as follows:

TABLE 2

SM coding of data symbols for two antennas

|  | Antenna 1 | | Antenna 2 | |
| --- | --- | --- | --- | --- |
| Subcarrier | Even Symbol | Odd Symbol | Even Symbol | Odd Symbol |
| Subcarrier 0 | $s_0$ | $s_{48}$ | $s_1$ | $s_{49}$ |
| Subcarrier 1 | $s_2$ | $s_{50}$ | $s_3$ | $s_{51}$ |
| Subcarrier 2 | $s_4$ | $s_{52}$ | $s_5$ | $s_{53}$ |
| Subcarrier 3 | $s_6$ | $s_{54}$ | $s_7$ | $s_{55}$ |
| Subcarrier 4 | $s_8$ | $s_{56}$ | $s_9$ | $s_{57}$ |
| Subcarrier 5 | $s_{10}$ | $s_{58}$ | $s_{11}$ | $s_{59}$ |
| Subcarrier 6 | $s_{12}$ | $s_{60}$ | $s_{13}$ | $s_{61}$ |
| Subcarrier 7 | $s_{14}$ | $s_{62}$ | $s_{15}$ | $s_{63}$ |
| Subcarrier 8 | $s_{16}$ | $s_{64}$ | $s_{17}$ | $s_{65}$ |
| Subcarrier 9 | $s_{18}$ | $s_{66}$ | $s_{19}$ | $s_{67}$ |
| Subcarrier 10 | $s_{20}$ | $s_{68}$ | $s_{21}$ | $s_{69}$ |
| Subcarrier 11 | $s_{22}$ | $s_{70}$ | $s_{23}$ | $s_{71}$ |
| Subcarrier 12 | $s_{24}$ | $s_{72}$ | $s_{25}$ | $s_{73}$ |
| Subcarrier 13 | $s_{26}$ | $s_{74}$ | $s_{27}$ | $s_{75}$ |
| Subcarrier 14 | $s_{28}$ | $s_{76}$ | $s_{29}$ | $s_{77}$ |
| Subcarrier 15 | $s_{30}$ | $s_{78}$ | $s_{31}$ | $s_{79}$ |
| Subcarrier 16 | $s_{32}$ | $s_{80}$ | $s_{33}$ | $s_{81}$ |
| Subcarrier 17 | $s_{34}$ | $s_{82}$ | $s_{35}$ | $s_{83}$ |
| Subcarrier 18 | $s_{36}$ | $s_{84}$ | $s_{37}$ | $s_{85}$ |
| Subcarrier 19 | $s_{38}$ | $s_{86}$ | $s_{39}$ | $s_{87}$ |
| Subcarrier 20 | $s_{40}$ | $s_{88}$ | $s_{41}$ | $s_{89}$ |
| Subcarrier 21 | $s_{42}$ | $s_{90}$ | $s_{43}$ | $s_{91}$ |
| Subcarrier 22 | $s_{44}$ | $s_{92}$ | $s_{45}$ | $s_{93}$ |
| Subcarrier 23 | $s_{46}$ | $s_{94}$ | $s_{47}$ | $s_{95}$ |

Inserting Pilot Symbols for DL MIMO

Figure 13A:
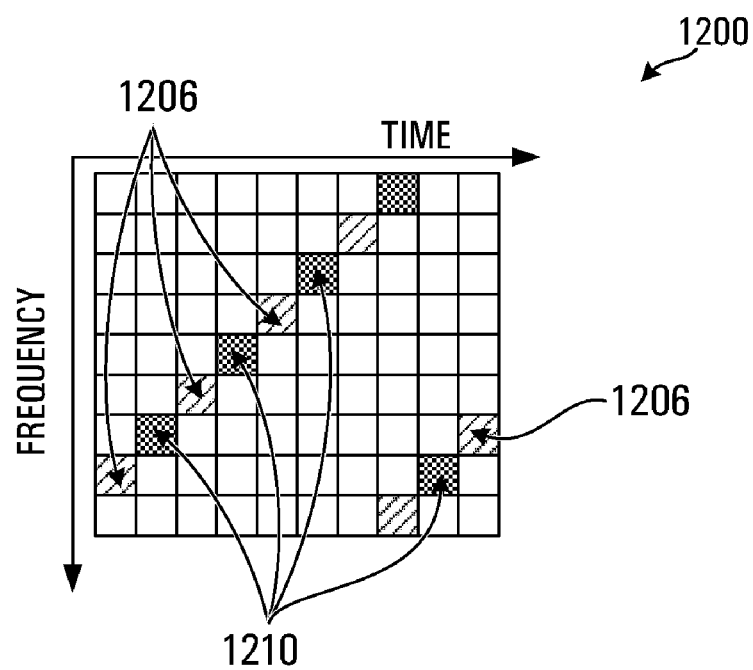
FIGS. 13A, 13B, 13C and 13D are time-frequency plots showing pilot symbol mappings for transmission on downlink antennas using a MIMO OFDM scheme according to embodiments of the invention.
Figure 13A:
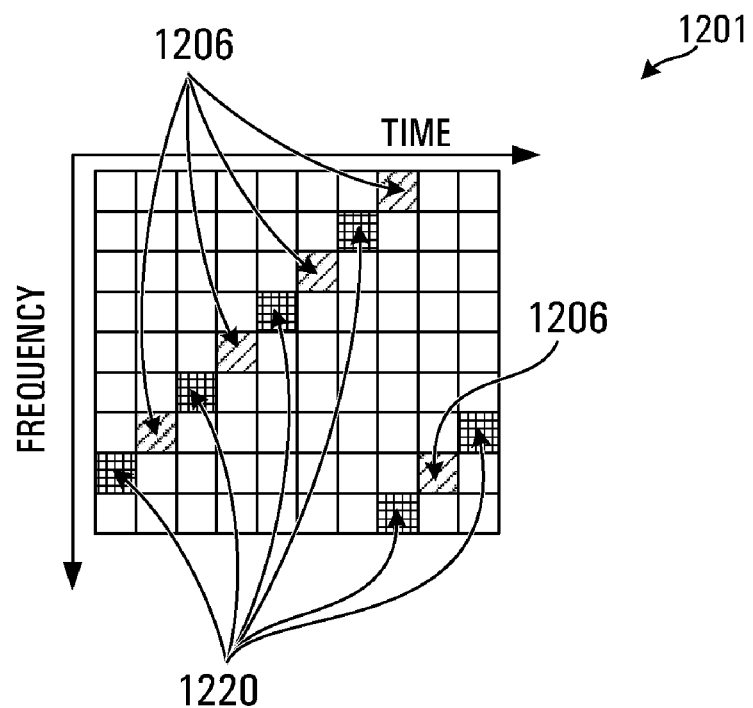

FIG. 13A illustrates an example of first and second pilot patterns 1200,1201 for DL transmission for a MIMO OFDM case for transmission on two antennas. For example, pilot pattern 1200 is for transmission on a first antenna and pilot pattern 1201 is for transmission on a second antenna.

The pilot patterns 1200,1201 are each two dimensional plots in which one dimension is a time direction and the other dimension is a frequency direction. The pilot patterns 1200, 1201 are shown to have a same size, in terms of a number of subcarriers and OFDM symbols, as the time-frequency plot 1000,1001 in FIG. 13A.

Pilot symbols in the first pilot pattern 1200 are generally indicated by reference character 1210. Pilot symbols in the second pilot pattern 1201 are generally indicated by reference character 1220. Null symbol locations in the first and second pilot patterns 1200,1201 are generally indicated by reference character 1206.

The pilot symbols 1210 and null symbol locations 1206 in the first pilot pattern 1200 and pilot symbols 1220 and null symbol locations 1206 in the second pilot pattern 1201 are illustrated in FIG. 13A occupying symbol locations in two negative sloping diagonal lines, respectively. The pilot symbols and null symbol locations in the illustrated example are located in symbol locations that are empty in the time-frequency patterns 1000,1001 of FIG. 12A.

Null symbol locations 1206 represent an absence of a symbol in that location of a given pilot pattern. In FIG. 13A, pilot symbols 1210 in the first pilot pattern 1200 are alternated on the diagonal slope with null symbol locations 1206. Pilot symbols 1220 in the second pilot pattern 1201 are alternated on the diagonal slope with null symbol locations 1206. The null symbol locations 1206 in the first pilot pattern 1200 are the locations of the pilot symbols 1220 in the second pilot pattern 1201 and the null symbol locations 1206 in the second pilot pattern 1201 are the locations of the pilot symbols 1210 in the first pilot pattern 1200. While the patterns 1200,1201 illustrate alternating pilot symbols and null symbol locations in FIG. 13A, those skilled in the art will recognize that other combinations of null symbol locations and pilot symbols may be employed. For example, the null symbol locations and pilot symbols may be ordered in a repeating pattern of two consecutive symbols of the diagonal slope being pilot symbols followed by two consecutive symbols of the diagonal slope being null symbol locations.

In some embodiments, the pilot symbols 1210,1220 and null symbol locations 1206 are inserted as one or more positive sloping diagonal lines. Furthermore, it is to be understood that pilot symbols can be allocated in patterns having different "rise-over-run" values for the slope, which is the relationship in the time (run) and frequency (rise) directions. FIG. 13A shows diagonal lines for each pilot pattern 1200,1201 with a rise over run of −1. More generally, the slope of the pilot symbols is implementation specific and can vary from a large positive value to a large negative value, excluding zero, allowing for a desirable number of pilots in a time-frequency pattern of a given size. In some implementations the pilot pattern is allocated prior to the data symbols being allocated.

While one or more diagonal lines may have a periodic repetition of diagonal sloping lines, it is to be understood that the present invention is not to be limited to only periodic repetition of diagonal sloping lines. For example, the spacing between diagonal lines may not be periodic in nature.

In some embodiments, different pilot patterns are defined that have a different spacing between parallel diagonal lines and one of the patterns thus defined is selected for each base station having one or more antennas. Having a different spacing between the parallel diagonal lines, in a direction normal to the diagonal lines, enables the density of the pilot symbols in a given time-frequency pattern to be increased or decreased. For example, spacing diagonal lines closer together enables insertion of more pilots per super slot. In some embodiments the density of pilot symbols transmitted from can be varied from one super slot to another for the same base station by varying the spacing of the parallel diagonal lines in respective super slots.

Figure 13B:
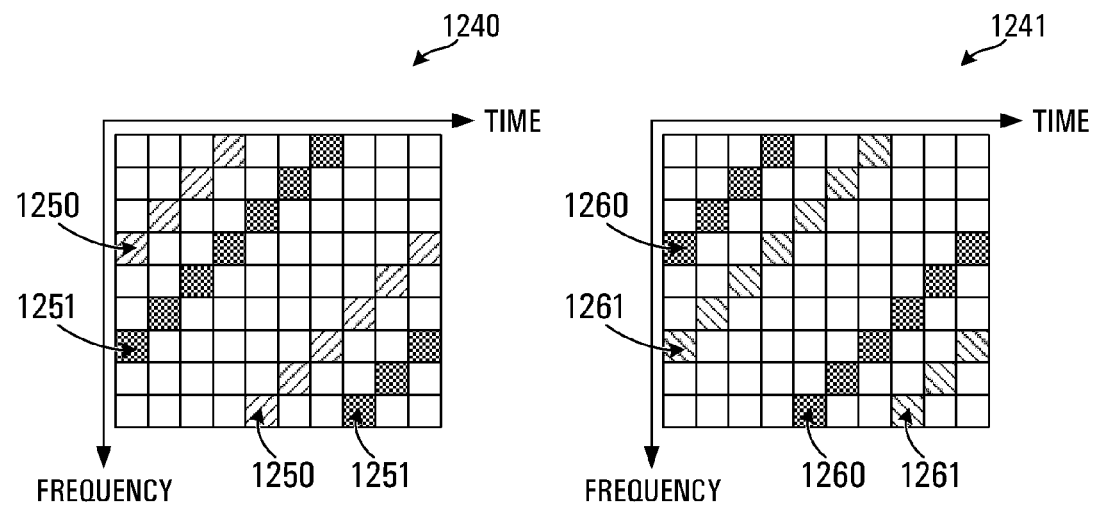

In the example of FIG. 13A the pilot symbols and the null symbol locations in each of the two pilot patterns 1200,1201 are in respective collinear diagonal lines. In some embodiments, as opposed to alternating pilot symbols and null symbol locations in the same collinear diagonal line, the pilot symbols and the null symbol locations form pairs of parallel diagonal lines in which a first diagonal line of the pair is all pilot symbols and a second diagonal line is all null symbol locations. FIG. 13B illustrates a pair of pilot patterns 1240,

1241 having such a pattern. By way of example these pilot patterns have a same size as the pilot patterns 1200,1201 of FIG. 13A. However, this is not intended to limit the scope of the invention to a time-frequency pattern having only one particular size. The size of the time-frequency pattern including both data and pilot symbols is implementation specific. In pilot pattern 1240, diagonal lines 1251 have null symbol locations and diagonal lines 1250 have pilot symbols. In pilot pattern 1241, diagonal lines 1261 have pilot symbols and diagonal lines 1260 have null symbol locations. In some embodiments the pilot symbol pattern is repeated for each super slot. In some embodiments the pilot symbol pattern is different for each super slot.

In some embodiments of the invention, additional pilot symbols are inserted in at least one time-frequency pattern of a group of the time-frequency patterns to enable a higher density of pilot symbols for that time-frequency pattern than for other time-frequency patterns of the group.

Figure 13C:
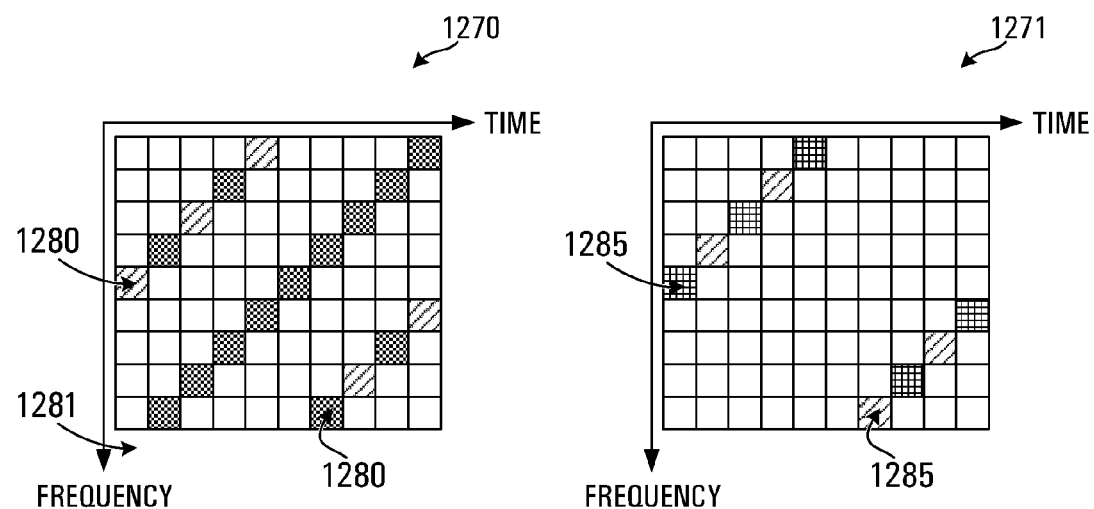
Figure 13D:
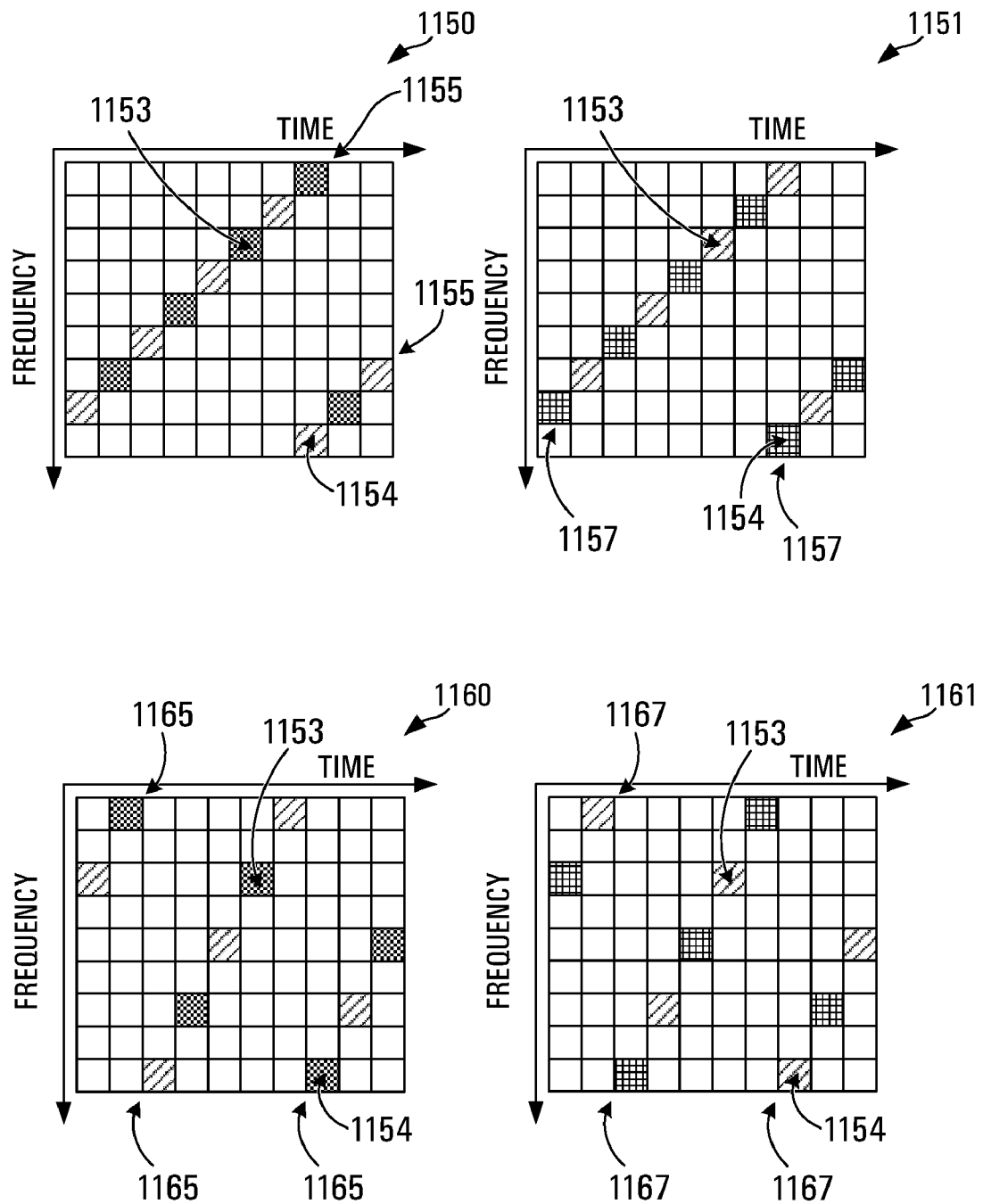

FIG. 13C illustrates a pair of pilot patterns 1270,1271. By way of example these pilot patterns have a same size as the pilot patterns 1200,1201 of FIG. 13A. Pilot pattern 1270 has a higher density of pilot symbols that pilot pattern 1271. Pilot pattern 1270 has three diagonal lines 1280,1281 of pilot patterns. Pilot pattern 1271 has two diagonal lines 1285 of pilot patterns. Two diagonal lines 1280 of the three diagonal lines in pilot pattern 1270 and the two diagonal lines 1285 in pilot pattern 1271 are similar to FIG. 13A in that the diagonal lines of respective patterns alternate between pilot symbols and null symbol locations. A third diagonal line 1281 of the three diagonal lines in pilot pattern 1270 is all pilot symbols. In some embodiments, locations in pilot pattern 1271 corresponding to the location of the third diagonal line 1281 in pilot pattern 1270 are null symbol locations. In some embodiments, locations in pilot pattern 1271 corresponding to the location of the third diagonal line 1281 in pilot pattern 1270 are used to transmit data symbols. In some embodiments, locations in pilot pattern 1271 corresponding to the location of the third diagonal line 1281 in pilot pattern 1270 are partially filled with pilot symbols in such a manner that the pilot symbol density of pilot pattern 1270 is still higher than pilot pattern 1270.

More generally, in some embodiments a pilot pattern used for transmission of MIMO OFDM symbols from an antenna of a group of collocated antennas has a higher density of pilot symbols than pilot patterns being transmitted from the other collocated antennas of the group.

In some embodiments the additional line or lines of pilot symbols in the higher density pilot pattern includes only pilot symbols. In some embodiments the additional line or lines of pilot symbols include null symbol locations alternated with the pilot symbols. The null symbol locations may be populated with data symbols when the data symbols are loaded into the pilot patterns. In some embodiments the pilot symbol pattern is repeated for each super slot. In some embodiments the pilot symbol pattern may be different from one super slot to the next.

In some implementations, base stations in different communication cells each have a unique diagonal slope for pilot symbols in the pilot patterns used by multiple antennas. In situations where a mobile station receives transmissions from each of two respective base stations of adjacent cells, if the diagonal lines of the pilot symbols in the pilot patterns are non-parallel, some pilot symbols transmitted by multiple base stations may occupy the same frequency and time symbol location. For example, in FIG. 13D, a first pair of pilot patterns 1150, 1151 for a first base station is shown having respective pilot patterns that each include two negative slope diagonal lines, generally indicated at 1155 for pilot pattern 1150 and 1157 for pilot pattern 1151, each with a rise-over-run equal to −1. A second pair of pilot patterns 1160,1161 for a second base station is shown having respective pilot patterns that each include three negative slope diagonal lines, generally indicated at 1165 for pilot pattern 1160 and 1167 for pilot pattern 1161, each with a rise-over-run equal to −2. A receiver receiving both pairs of pilot patterns 1150,1151 and 1160, 1161 would receive pilots at the same OFDM symbol on the same subcarrier at two symbol locations identified by reference characters 1153 and 1154.

To overcome a problem that would be caused by two pilots occupying the same location in time and frequency, in some embodiments pre-processing techniques are used to encode pilot symbols that are varied for different base stations. Each respective base station indicates to receivers that a particular type of pre-processing is used to encode pilots. In this way a receiver can differentiate received pilots symbols, even when received at the same OFDM symbol on a same subcarrier. An example of such pre-processing may involve modifying the pilot symbols with a phase variance that they would not otherwise have and that is different from the phase variance of the pilot symbols transmitted by other base stations in other communication cells.

In some embodiments, pre-processing is performed by the pilot inserter 23 of FIG. 2 and involves a particular space-time coding pattern for the pilots that is different than a space-time coding pattern for pilot symbols transmitted by other base stations in other communication cells.

Inserting Data and Pilot Symbols for UL MIMO

Figure 14A:
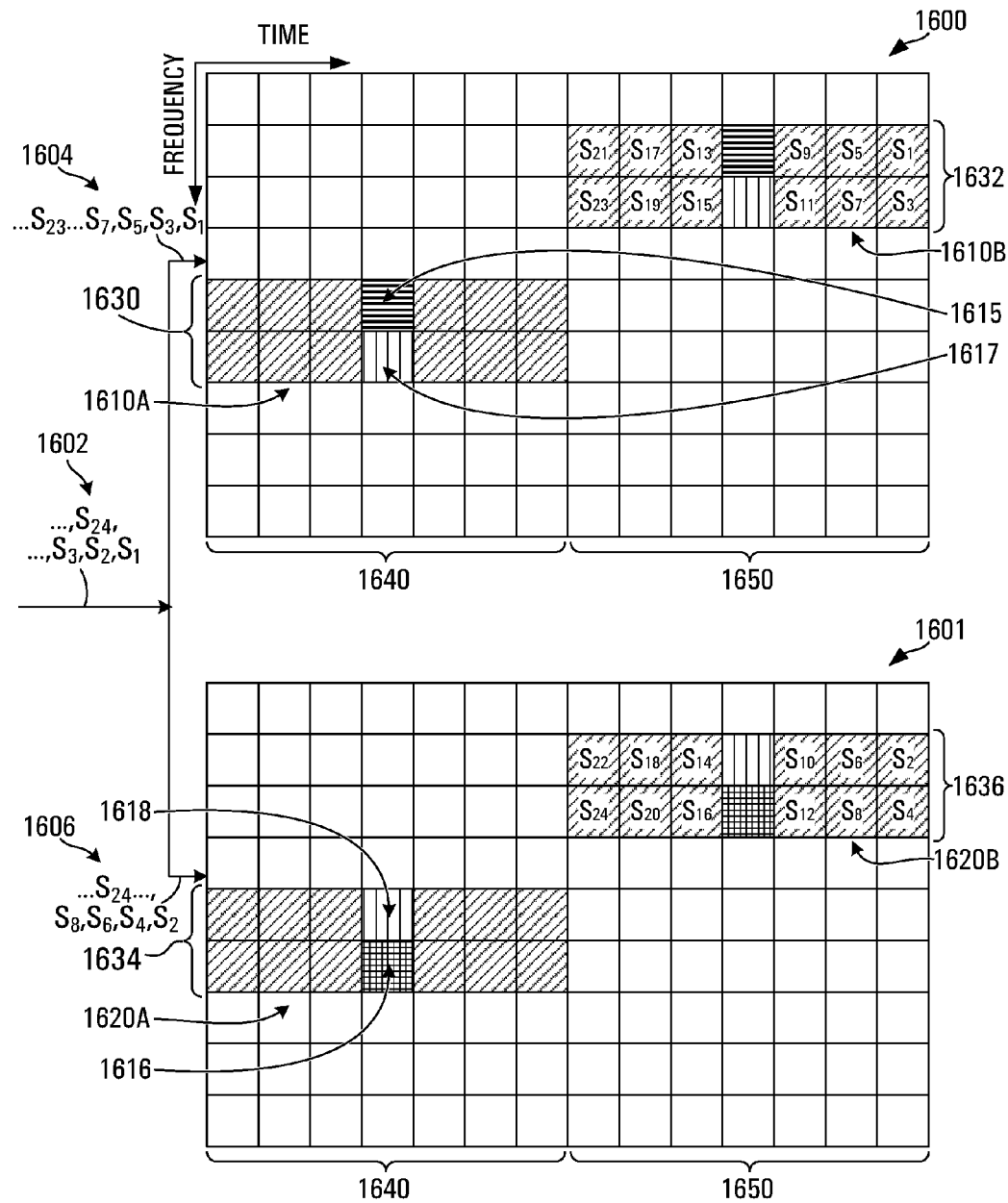
FIGS. 14A and 14B are time-frequency plots showing data symbol and pilot symbol mapping for transmission on uplink antennas using a MIMO OFDM scheme according to an embodiment of the present invention.

FIG. 14A illustrates an example of time-frequency patterns 1600,1601 showing data mapping and pilot mapping for UL transmission antennas using a MIMO OFDM scheme. The time-frequency patterns 1600,1601 are two dimensional plots in which one dimension is a time direction and the other dimension is a frequency direction. In the frequency direction, each discrete horizontal row represents a single subcarrier. Each discrete vertical column represents an OFDM symbol.

Time-frequency pattern 1600 shows a multiple symbol grouping 1610A used to transmit symbols on a pair of adjacent subcarriers 1630 in a first segment 1640 of seven OFDM symbols before hopping to a different pair of subcarriers 1632 for transmission of symbol grouping 1610B in a second segment 1650 of seven OFDM symbols. Time-frequency pattern 1600 is for transmission on a first antenna.

Time-frequency pattern 1601 shows a symbol grouping 1620A used to transmit symbols on an adjacent pair of subcarriers 1634 in the first segment 1640 of seven OFDM symbols before hopping to a different pair of subcarriers 1636 for transmission of symbol grouping 1620B in the second segment 1650 of seven OFDM symbols. Time-frequency pattern 1601 is for transmission on a second antenna.

In some embodiments, the first and second antennas on which time-frequency patterns 1600,1601 are transmitted are respective antennas on a single mobile station. In some embodiments, the first and second antennas on which time-frequency patterns 1600,1601 are transmitted are an antenna on a first mobile station and an antenna on second mobile station operating in a synchronized, cooperative manner. Using antennas in separate mobiles in a cooperative manner is described in further detail below.

Symbol grouping 1620A is described above as including symbols on an adjacent pair of subcarriers 1634. In some embodiments, adjacent subcarriers in the frequency direction are a set of consecutive subcarriers of an allocated frequency band. In some embodiments, adjacent subcarriers in the frequency direction are a set of subcarriers that are not necessarily consecutive, but are a selection of subcarriers grouped together to form a "logical" subband of subcarriers.

Each symbol grouping 1610A,1610B,1620A,1620B in the respective segments utilizes a pair of subcarriers for a duration of seven OFDM symbols, then the transmission for the particular mobile station hops to a different subcarrier. More generally, the number of OFDM symbols in a segment is implementation specific and is not limited to the particular example of seven OFDM symbols as illustrated in FIG. 14A.

In some embodiments a hopping sequence is periodic having a period defined by a "super slot", formed by multiple concatenated segments. The super slot of FIG. 14A is shown to have a duration of two segments 1640,1650. More generally, it is to be understood that the duration of the super slot is implementation specific and can be greater than the two segments shown in FIG. 14A. Similarly, the number of subcarriers in the time-frequency patterns 1600,1601 is implementation specific and can be greater than or less than the nine subcarriers shown in FIG. 14A.

Symbol groupings 1610A and 1620A are inserted at the same position in the two respective time-frequency patterns 1600,1601. Similarly, symbol groupings 1610B and 1620B are inserted at the same position in the two respective time-frequency patterns 1600,1601.

During insertion of the symbols, a transmission data stream 1602, which for example includes symbols "... $S_{24}$, ... $S_2$, $S_1$", is divided into first data stream 1604 including odd-numbered symbols "... $S_{23}$, ... $S_3$, $S_1$" and second data stream 1606 including even-numbered symbols "... $S_{24}$, ... $S_4$, $S_2$". The first and second data streams 1604,1606 are mapped to the time-frequency patterns 1600,1601 respectively. The odd-numbered symbols "... $S_{23}$ ... $S_3$, $S_1$" are mapped to time-frequency pattern 1600 for transmission on sub-carriers of the first antenna and the even-numbered symbols "... $S_{24}$, ... $S_4$, $S_2$" are mapped to time-frequency pattern 1601 for transmission on sub-carriers of the second antenna. One of ordinary skill in the art will recognize that the transmission data stream 1602 can be mapped to more than two antennas by separating the transmission date stream into more than two streams and mapping to more than two time-frequency patterns.

For each time-frequency pattern, the respective data streams 1604 and 1606 are allocated using symbol groupings, for example 1610A and 1610B which each occupy seven OFDM symbols. Odd-numbered symbols "$S_{23}$, $S_{21}$, $S_{19}$, $S_{17}$, $S_{15}$, $S_{13}$, $S_{11}$, $S_9$, $S_7$, $S_5$, $S_3$, $S_1$" are mapped to time-frequency pattern 1600 as one symbol grouping 1610B. Even-numbered symbols "$S_{24}$, $S_{22}$, $S_{18}$, $S_{16}$, $S_{14}$, $S_{13}$, $S_{12}$, $S_{10}$, $S_8$, $S_6$, $S_4$, $S_2$" are mapped to time-frequency pattern 1601 as one symbol grouping 1620B. One of ordinary skill in the art would recognize that other arrangements for allocating the symbols are possible. Furthermore, the present invention is not limited to the use of two antennas for transmission of data packets on the up link transmission channel. Illustration of time-frequency patterns for use with two antennas is employed simply as an example, and is not intended to limit the scope of the invention.

FIG. 14A shows only a portion of the time-frequency patterns 1600,1601 filled with symbols for transmission. It is to be understood that data symbols can fill some or all of the available symbol locations in the time-frequency patterns 1600,1601 after pilot symbols are located in the time-frequency pattern. FIG. 14A shows only locations filled in the time-frequency patterns to be transmitted by a respective pair of antennas from a single mobile. Other mobiles are transmitting time-frequency patterns having a similar time-frequency structure, but in a manner that provides that data and pilots of the single mobile and the other mobiles do not interfere with one another. Furthermore, while symbols for transmission on a single data stream 1602 are shown in FIG. 14A to be divided into two data streams 1604,1606, it is to be understood that more than two time-frequency patterns can be generated from each of one or more data streams.

Only a single pair of subcarriers 1630,1634 is utilized in each segment for each data stream 1604,1606. However, it is to be understood that a data stream could be mapped to more one than one pair of subcarriers in each segment.

A hopping sequence is formed by multiple concatenated segments, each segment including symbol groupings hopping amongst different subcarriers. While FIG. 14A shows only two concatenated segments 1640,1650 with a single frequency hop occurring for each data stream 1604,1606, it is to be understood that the number of segments in a hopping sequence is implementation specific and may be greater than or less than the two segments 1550,1560 shown in FIG. 14A.

In some embodiments the symbol groupings are not on immediately adjacent subcarriers, but the subcarriers may be spaced apart by a particular number of subcarriers. In some embodiments the spacing of the pairs of subcarriers, either immediately adjacent or spaced apart, are maintained for all concatenated segments forming a periodic super slot. In some embodiments the spacing of the pairs of subcarriers, either immediately adjacent or spaced apart, varies from segment to segment in each of the concatenated segments forming a periodic super slot.

In some embodiments the hopping sequences are different in adjacent communication cells.

The symbol groupings 1610A,1610B,1620A,1620B for each mobile station of the time-frequency pattern 1600,1601 include data symbols as well as pilot symbols.

In the example of time-frequency pattern 1600, in the first segment 1640 a pilot symbol 1615 is inserted on one of the subcarriers of the pair of subcarriers 1630 and a null symbol location 1617 is inserted on the other subcarrier of the pair of subcarriers. Both the pilot symbol 1615 and null symbol location 1617 are inserted in the same OFDM symbol, that is the fourth OFDM symbol of the seven OFDM symbols forming the duration of the first segment 1640. A similar pattern is found in the second segment 1650 for a pilot symbol and null symbol location in symbol grouping 1610B.

In time-frequency pattern 1601, a similar pattern is found for a pilot symbol 1616 and null symbol location 1618, except that the pilot symbol 1616 and null symbol location 1618 are on opposite subcarriers of the pair of subcarriers 1634 than the pilot symbol 1615 and null symbol location 1617 of time-frequency pattern 1600.

In the illustrated example, the pilot symbol and null symbol location are shown in both segments 1640,1650 in both time-frequency patterns 1600,1601 to be inserted at the fourth OFDM symbol. It is to be understood that the location of the pilot symbol and null symbol location is implementation specific and they may occur on any of the OFDM symbols in a given segment. In some embodiments the pilot symbol and null symbol location are inserted in a same OFDM symbol position for the same data stream in each respective segment, for example frequency hopping symbol groupings 1610A, 1610B. In some embodiments the pilot symbol and null symbol location are inserted in a different OFDM symbol position for the same data stream in each respective segment.

Figure 14B:
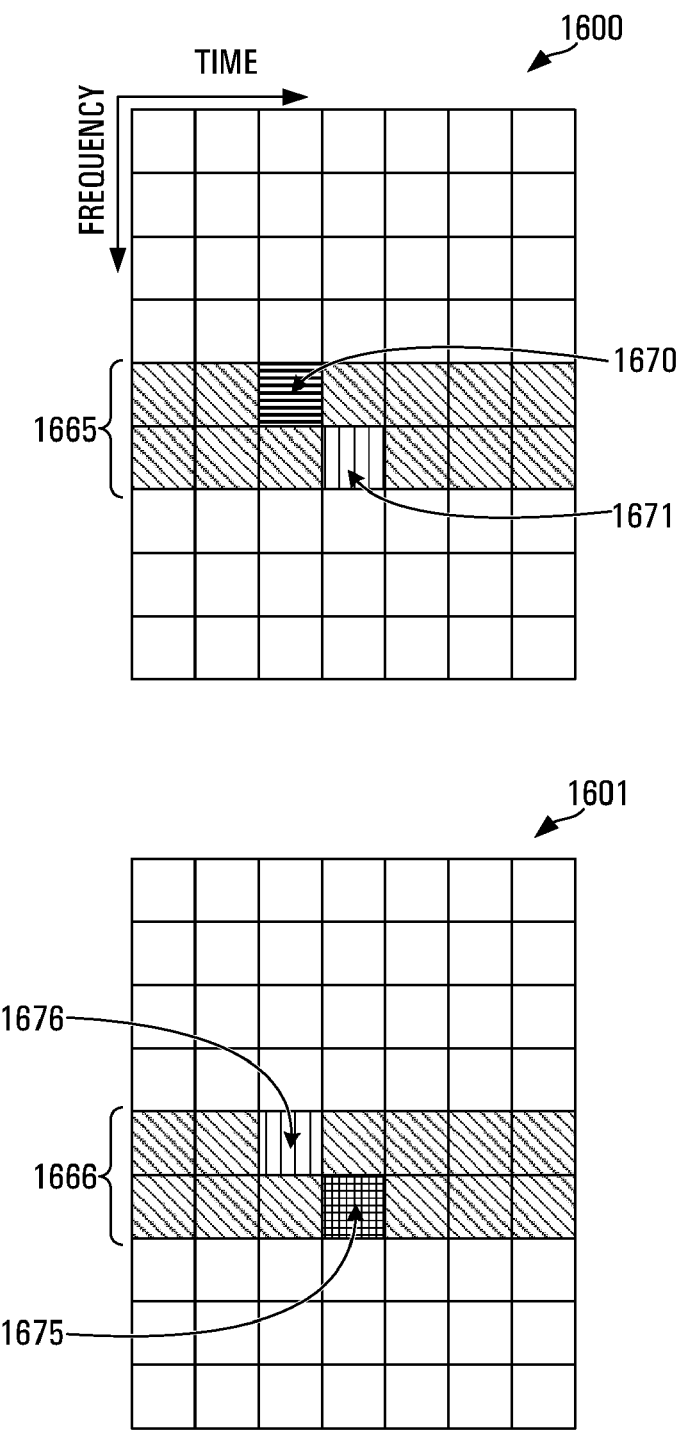

In the illustrated example, the pilot symbol 1615 is shown to occur on the first subcarrier of the pair of subcarriers and the null symbol location 1617 to occur on the second subcarrier of the pair of subcarriers of symbol groupings 1610A, 1610B in time-frequency pattern 1600 and the null symbol location 1618 is shown to occur on the first subcarrier of the pair of subcarriers and the pilot symbol 1616 to occur on the second subcarrier of the pair of subcarriers of symbol grouping 1620A,1620B in time-frequency pattern 1601. In some embodiments the insertion of the pilot symbol and the null symbol location change positions in the pair of subcarrier for some or all segments. For example, FIG. 14B shows a single segment for each of a pair of time-frequency patterns 1660, 1661 similar to segment 1640 of FIG. 14A. The segment is seven OFDM symbols by nine subcarriers. Time-frequency pattern 1660 is for example for transmission on a first antenna and time-frequency pattern 1661 is for example for transmission on a second antenna. In each of the pair of time-frequency patterns 1660,1661, a pair of subcarriers 1665,1666, namely the fifth and sixth subcarriers are used for transmitting data and pilot symbols in a similar manner to FIG. 14A. In the first time-frequency pattern 1660 a pilot symbol 1670 is located in the third OFDM symbol location of the first subcarrier of the pair of subcarriers 1665 and a null symbol location 1671 is located in the fourth OFDM symbol location of the second subcarrier of the pair of subcarriers 1665. In the second time-frequency pattern 1661 a pilot symbol 1675 is located in the fourth OFDM symbol location of the first subcarrier of the pair of subcarriers 1666 and a null symbol location 1676 is located in the third OFDM symbol location of the second subcarrier of the pair of subcarriers 1666.

Referring to FIG. 14A, each symbol grouping 1610A, 1610B,1620A,1620B in the respective segments 1640,1650 utilizes a pair of subcarriers for a duration of seven OFDM symbols, then the transmission for a data stream hops to a different subcarrier. More generally, the number of OFDM symbols in a segment is implementation specific and is not limited to the particular example of seven OFDM symbols as illustrated in FIG. 14A.

In some embodiments a hopping sequence is periodic having a period defined by a "super slot" that includes two or more segments. The super slot of FIG. 14A is shown to have a duration of two segments 1640,1650. More generally, it is to be understood that the duration of the super slot is implementation specific and can be greater than the two segments shown in FIG. 14A. Similarly, the number of subcarriers in the time-frequency patterns 1600,1601 is implementation specific and can be greater than or less than the nine subcarriers shown in FIG. 14A.

In some embodiments, at least one pilot symbol is mapped in the symbol grouping 1610A,1610B for each segment 1640. In some embodiments, pilot symbols are not included in each segment. In such situations, interpolation can be performed to estimate channel characteristics for those segments not having a pilot symbol by using the pilot symbols from adjacent segments.

In some embodiments of the invention, a pair of UL pilots, one pilot in each of the time-frequency patterns 1600,1601, corresponds to a pilot for each transmission antenna. This may occur when a data stream from a respective mobile station is mapped to multiple antennas of that mobile station. In some embodiments of the invention, a pair of UL pilots, one pilot in each of the time-frequency patterns 1600,1601, corresponds to a pilot for each respective mobile station. This may occur for two or more antenna operating in combined manner when a data stream from a first mobile station is mapped to only a single antenna of the first mobile station and a data stream from a second mobile station is mapped to only a single antenna of the second mobile station. Those skilled in the art will also be aware that the data streams from any number of users can be mapped to any number of transmission antennas.

In some embodiments, a frequency hopping pattern for pilot symbols, in which a transmission frequency for a given data stream hops after a multiple of OFDM symbols, is created by inserting one or more pilot symbols in a plurality of OFDM symbols on a different pair of subcarriers of an allocated transmission bandwidth than a pair of subcarriers used prior to the most recent frequency hop.

FIG. 14A illustrates inserting data symbols in time-frequency patterns 1600,1601 in a similar manner to that of FIG. 12A. A data stream of symbols "$S_1, S_2, \ldots S_{24}$" 1602 is divided into respective streams of odd-numbered and even-numbered symbols 1604,1606. The odd-numbered symbols 1604 are mapped to the pair of sub-carriers 1632 in time-frequency pattern 1600 and the even-numbered symbols 1606 are mapped to the pair of sub-carriers 1636 in time-frequency pattern 1601.

FIGS. 12 and 14A illustrate a single data stream being divided into first and second data streams that are each mapped to respective time-frequency patterns. However, in some implementations, data streams for two different transmitters are mapped to respective time-frequency patterns for transmission on antennas of the two different transmitters. This form of combined MIMO transmission of a synchronized time-frequency pattern from antennas on at least two different transmitters is referred to as virtual MIMO. For example, two mobile stations, each having a single antenna are coordinated to each provide a time-frequency pattern in a similar fashion that a single transmitter provides two time-frequency patterns for each of two antennas from one or more data streams. Similarly, two base stations in adjacent cells could each dedicate a single antenna to communicate with at least one mobile station that is close to the cell boundary using a virtual MIMO scheme.

In some embodiments for DL and/or UL transmission, the pilot pattern is cyclically offset, in a time direction and/or in a frequency direction, to form re-use patterns. For example, multiple time-frequency patterns employ the same arrangement of pilot symbols, but respective arrangements are offset in at least one of time and frequency for one or more of the multiple time-frequency patterns for use by different mobile stations. In some embodiments, time-frequency patterns can be selected from the multiple time-frequency patterns for use by different mobile stations to avoid interference between mobile stations transmitting to the same base station. In some embodiments, time-frequency patterns can be selected from the multiple time-frequency patterns for use by different base stations to avoid interference between base stations transmitting in adjacent cells. Therefore, in some embodiments, the base station and/or mobile stations of adjacent communication cells use pilot patterns that are the same pattern, but are cyclically offset in time and/or frequency with respect to one another.

In some embodiments for DL and/or UL transmission, the pilot symbols are transmitted with a power level greater than a power level of data symbols, depending upon a value reflective of channel conditions.

Figure 15:
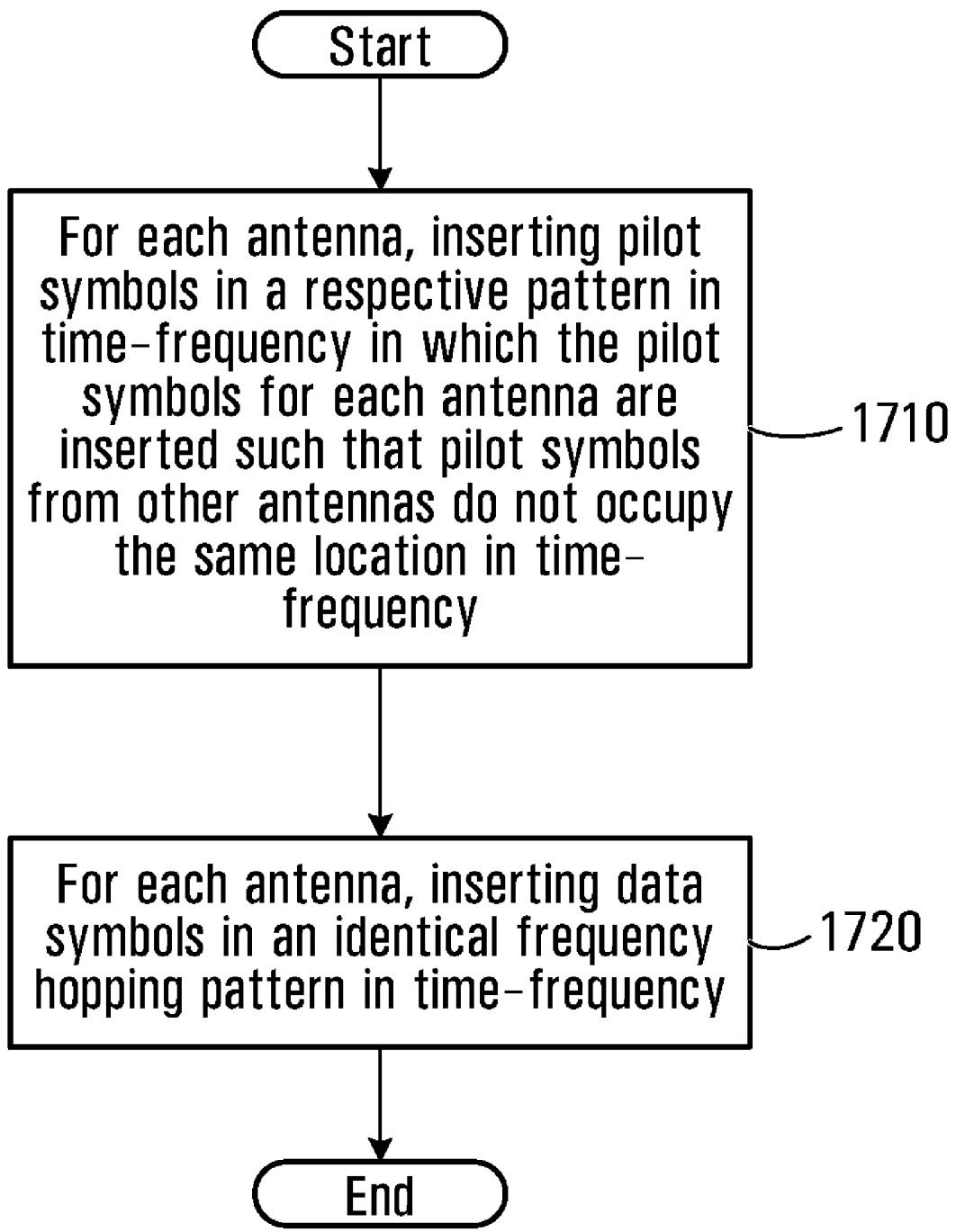
FIG. 15 is a flowchart of a method by which an OFDM transmitter inserts data symbols and pilot symbols into an OFDM frame according to one embodiment of the invention.

With reference to FIG. 15, a general method for implementing insertion of data symbols and pilot symbols into an OFDM transmission resource to create the above-described time-frequency patterns will now be described. The method can be used for creating DL time-frequency patterns and/or UL time-frequency patterns. A first step 1710 involves for each antenna, inserting pilot symbols in a respective pattern in time-frequency in which the pilot symbols for each antenna are inserted such that that pilot symbols from other antennas do not occupy the same location in time-frequency. A second step 1720 involves, also for each antenna, inserting data symbols are in an identical frequency-hopping pattern in time-frequency.

In some embodiments, the method is applied to a transmitter in which the number of antennas is two. In some embodiments, the method is applied to a transmitter in which the number of antennas is greater than two.

In some embodiments, the method is used for inserting data symbols and pilot symbols for DL signaling between a base station and one or more mobile stations. Examples of such methods will be described with regard to FIGS. 16A, 16B and 16C.

In some embodiments pilot symbols are inserted in a DL time-frequency pattern such that each pilot symbol is offset from a previous pilot symbol in at least one of a time and a frequency direction in a same direction as the previous pilot symbol is from all previously inserted pilot symbols so that the pilot symbols form at least one diagonal line in the time-frequency pattern.

A manner in which pilot symbols are inserted in time-frequency so that pilot symbols do not occupy the same location in time-frequency on different antennas for when the number of antennas is equal to two will be described with respect to FIG. 16A. At step 1710A for each of the antennas, pilots are inserted in the DL time-frequency pattern by alternating insertion of null symbol locations and pilot symbols in at least one diagonal line for a first antenna of the pair of antennas and alternating insertion of pilot symbols and null symbol locations in at least one diagonal line for a second antenna of the pair of antennas. The null symbol locations of the first antenna correspond to a same location in time-frequency as the pilot symbols of the second antenna, and vice versa. Step 1720 is the same as step 1720 of FIG. 15.

Figure 16A:
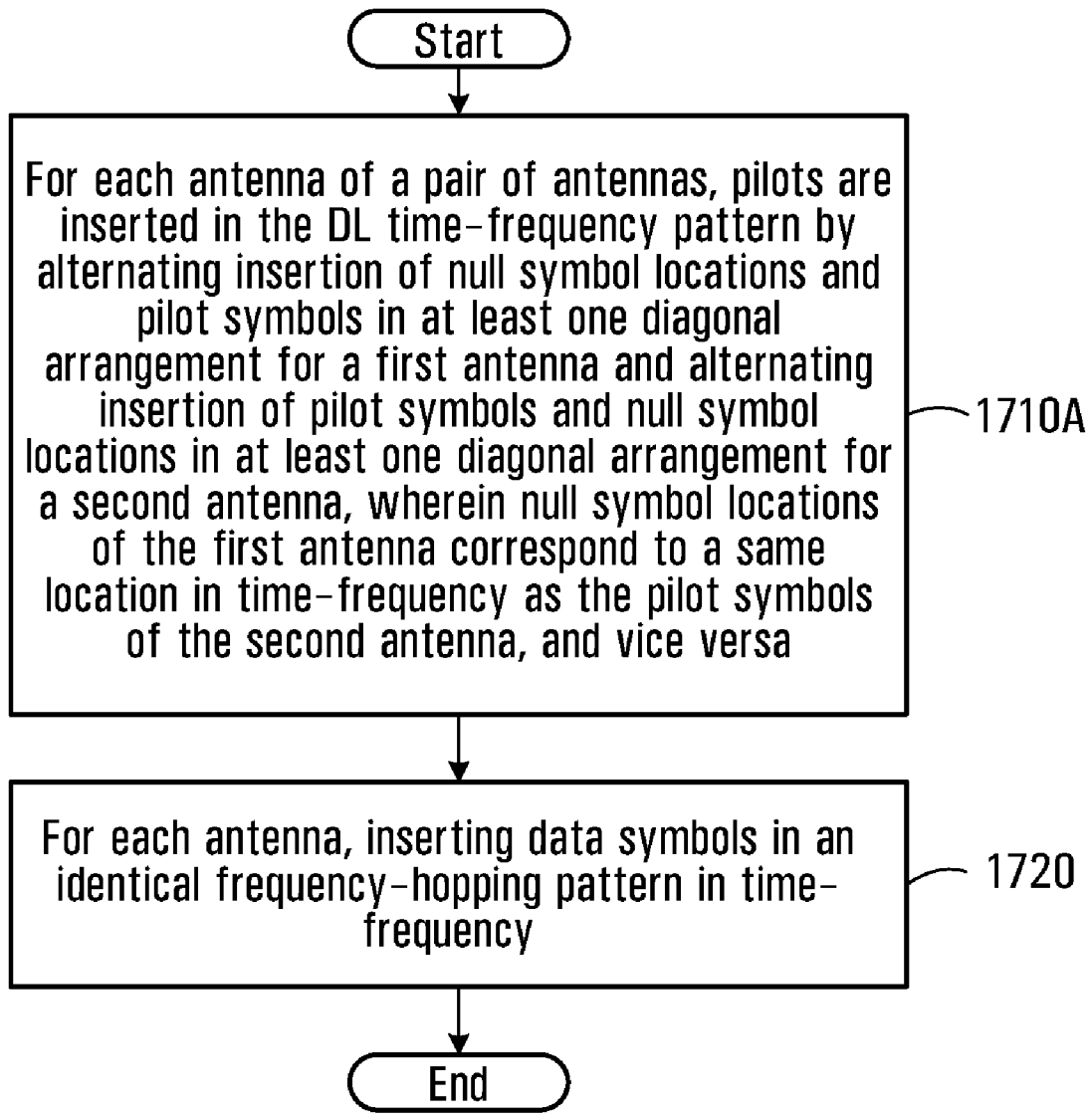
FIGS. 16A, 16B and 16C are flowcharts of methods used for inserting data symbols and pilot symbols in time-frequency patterns for DL signaling between a base station and one or more mobile stations.
Figure 16B:
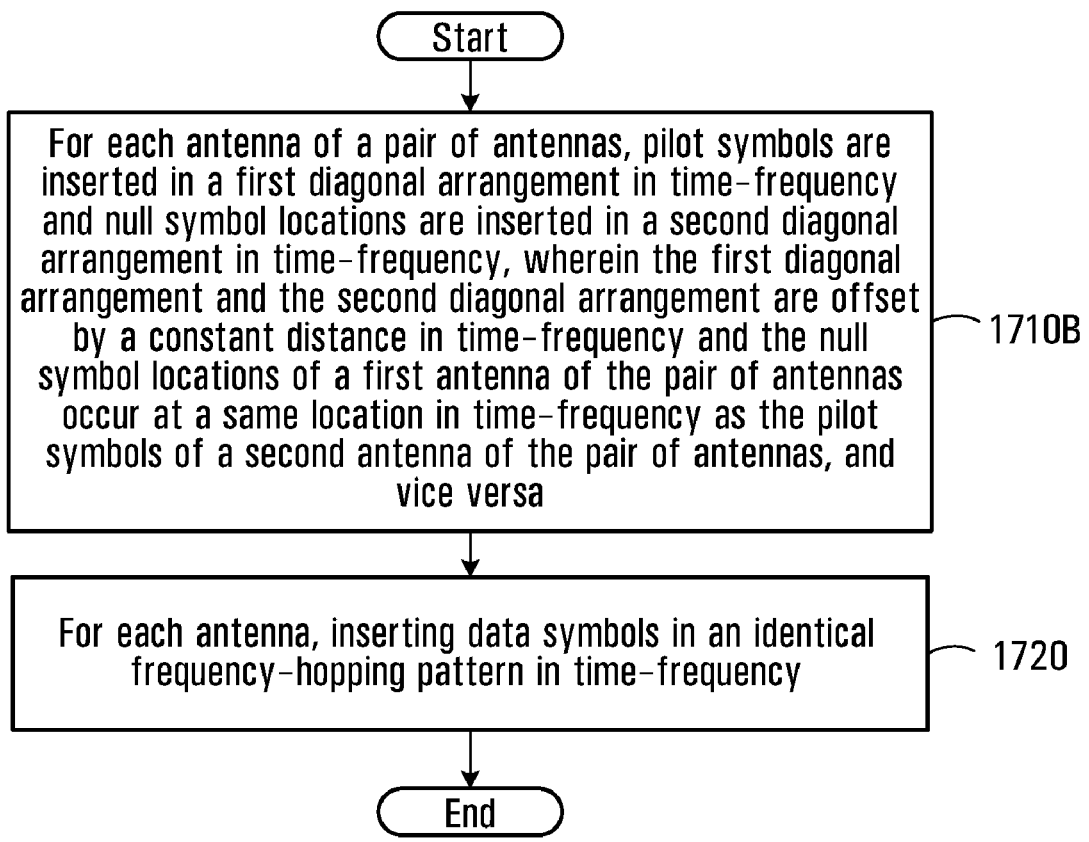

FIG. 16B illustrates another embodiment of inserting pilot symbols. At step 1710B, for each antenna of a pair of antennas, pilot symbols are inserted in a first diagonal line in time-frequency and null symbol locations are inserted in a second diagonal line in time-frequency. The first diagonal line and the second diagonal line are offset by a constant distance in time-frequency and the null symbol locations of a first antenna of the pair of antennas occur at a same location in time-frequency as the pilot symbols of a second antenna of the pair of antennas, and vice versa. Step 1720 is the same as step 1720 of FIG. 15.

With regard to step 1710 of FIG. 15, step 1710A of FIG. 16A and 1710B of FIG. 16B, in some embodiments, a larger number of pilot symbols are inserted in the time-frequency pattern of at least one antenna of a group of antennas such that the density of pilot symbols for the at least one antenna is higher than for other antennas in the group.

Figure 16C:
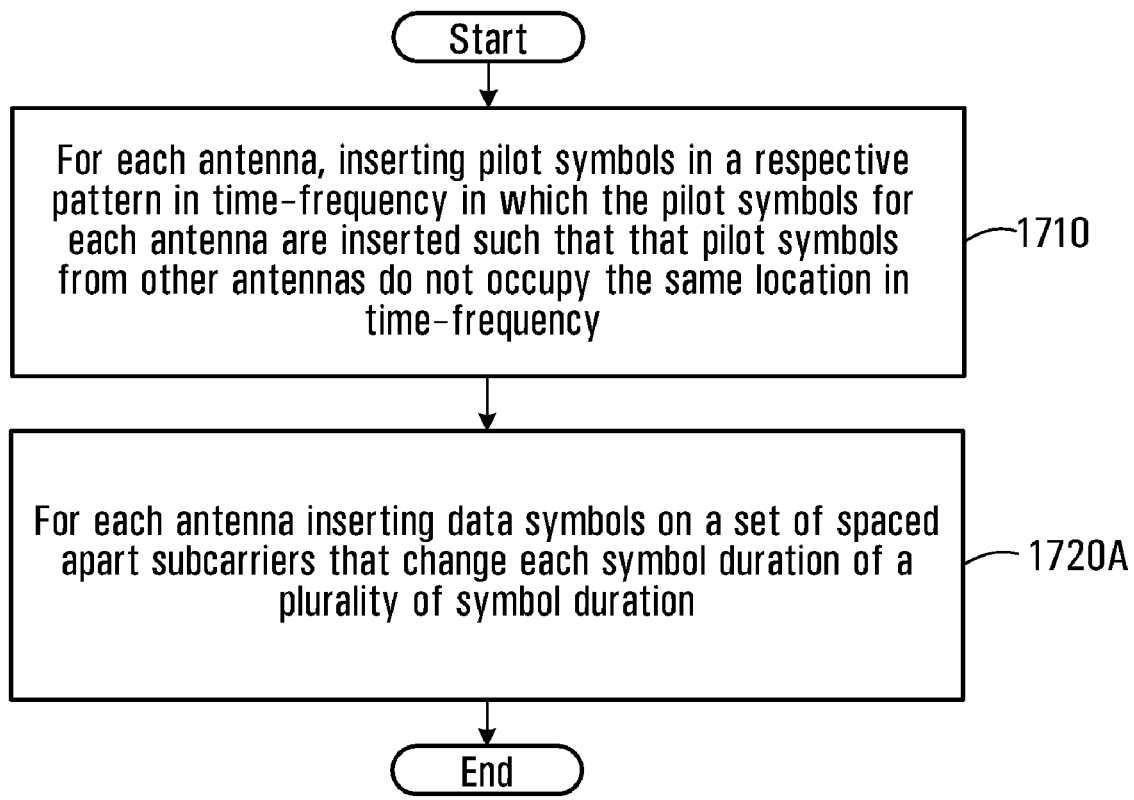

Referring to FIG. 16C, a method will now be described for inserting data symbols in an identical frequency hopping pattern. Step 1710 is the same as step 1710 of FIG. 15. At step 1720A, for each antenna when the number of antennas is equal to two, data symbols are inserted on a set of spaced apart subcarriers that change each symbol duration of a plurality of symbol durations. In other words, for each frequency hop, at least one data symbol of a series of data symbols is inserted on a set of different subcarriers of an allocated transmission bandwidth than a set of subcarriers used prior to a most recent frequency hop for a previous at least one data symbol of the series of data symbols. In some embodiments, frequency-hopping occurs for data symbols in a group of OFDM durations on one or more sub-carriers, as opposed to occurring for each OFDM symbol.

FIGS. 16A, 16B and 16C are described above as being methods for use with two antennas. More generally, the methods can be used for more than two antennas.

In some embodiments, the method is used for inserting data symbols and pilot symbols for UL signaling between one or more mobile stations and a base station. Examples of such methods will be described with regard to FIGS. 17A and 17B.

A manner in which pilot symbols are inserted in time-frequency so that pilot symbols do not occupy the same location in time-frequency on different antennas for when the number of antennas is equal to two will be described with respect to FIG. 17A. At step 1710C, for each antenna in a pair of antennas, a null symbol location and a pilot symbol are inserted for a first antenna of the pair of antennas and a pilot symbol and a null symbol location are inserted for a second antenna of the pair of antennas, such that the null symbol location of the first antenna is inserted at the same location in time-frequency as the pilot symbol of the second antenna, and vice versa. Step 1720 is the same as step 1720 of FIG. 15.

Figure 17A:
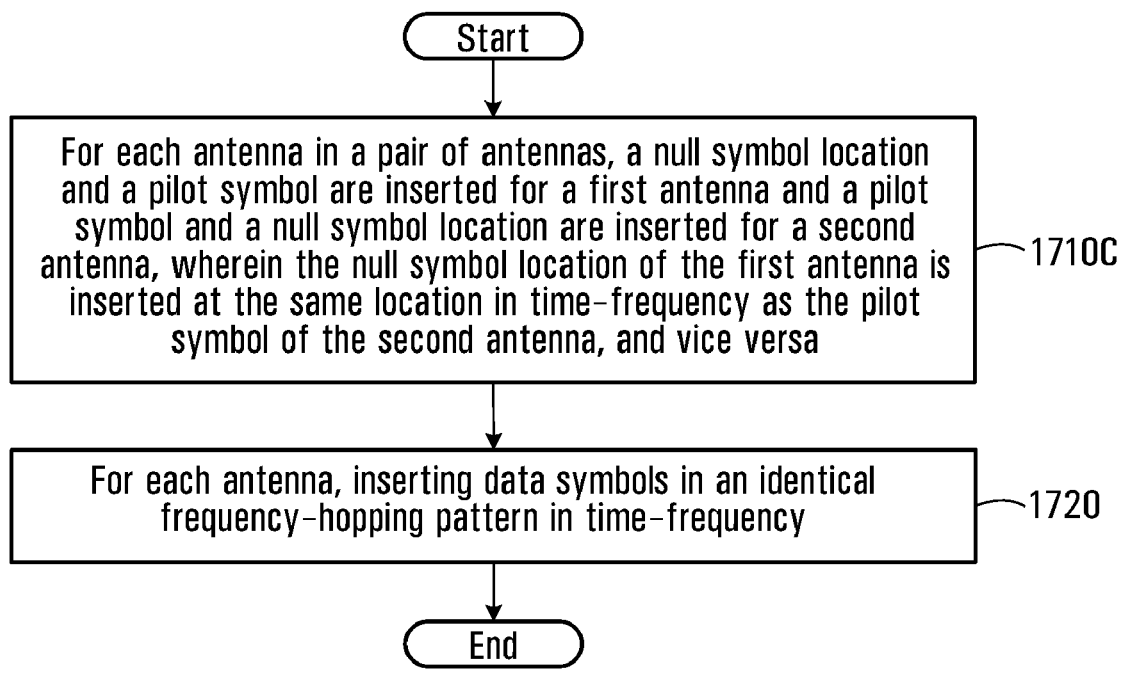
FIGS. 17A and 17B are flowcharts of methods used for inserting data symbols and pilot symbols in time-frequency patterns for UL signaling between one or more mobile stations and a base station.
Figure 17B:
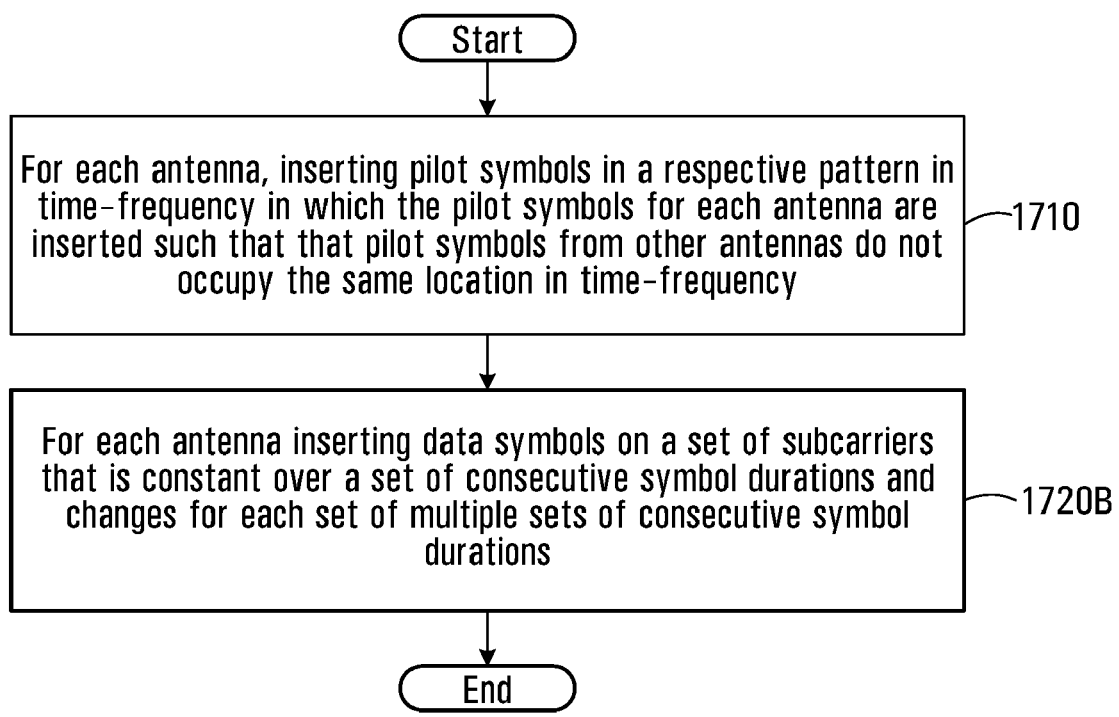

Referring to FIG. 17B, a method will now be described for inserting data symbols in an identical frequency hopping pattern. Step 1710 is the same as step 1710 of FIG. 15. At step 1720B, for each antenna when the number of antennas is equal to two, data symbols are inserted on a set of subcarriers that is constant over a set of consecutive symbol durations, and change for each set of multiple sets of consecutive symbol duration. That is for each frequency hop, a plurality of data symbols of the series of data symbols is inserted in a corresponding plurality of OFDM symbols on one or more subcarriers of an allocated transmission bandwidth than one or more subcarriers used prior to a most recent frequency hop for a previous plurality of data symbols of the series of data symbols.

FIGS. 17A and 17B are described above as being methods for use with two antennas. More generally, the methods can be used for more than two antennas.

A transmitter used to implement some embodiments of the invention may include a plurality of transmit antennas, an encoder for inserting data symbols in an identical frequency-hopping pattern in time-frequency for each of the plurality of antennas. In some embodiments the transmitter includes a pilot inserter for inserting pilot symbols in a respective pattern in time-frequency for each of the antennas, wherein the pilot symbols for each antenna are inserted such that pilot symbols from other antennas do not occupy the same location in time-frequency. In some embodiments the transmitter is of the form of the transmitter shown in FIG. 2, in which the encoder is encoder 14 and the pilot inserter is pilot inserter 23.

A receiver used to implement some embodiments of the invention receives OFDM symbols including pilot symbols in a respective pattern in time-frequency and data symbols in an identical frequency-hopping pattern in time-frequency, the pilot symbols for each respective pattern in time-frequency inserted such that pilot symbols from different antennas do not occupy the same location in time-frequency and for receiving information identifying a particular form of pre-processing used to encode the received pilot symbols from at least one source. In some embodiments the receiver is of the form of the receiver shown in FIG. 3.

In some embodiments, the receiver further includes logic for differentiating pilots from different sources. In some embodiments, differentiating pilot logic is included as a part of channel estimation functionality, for example channel estimator 72 of FIG. 3. As described above received symbols are passed to channel estimator 72, which analyses received pilots symbols located at known times and frequencies within the OFDM frame. In some embodiments, the differentiating pilot logic is a separate functionality from the channel estimation functionality. In some embodiments, the differentiating pilot logic utilizes the information identifying the particular form of pre-processing used to encode the received pilot symbols to differentiate between received pilot symbols from different sources occurring at a same time-frequency location.

What has been described is merely illustrative of the application of the principles of the invention. Other arrangements and methods can be implemented by those skilled in the art without departing from the spirit and scope of the present invention.

The invention claimed is:

1. An OFDM receiver, comprising:
    at least one receive antenna operable to receive OFDM symbols transmitted from a plurality of transmit antennas, the OFDM symbols transmitted from each transmit antenna comprising pilot symbols in a respective pattern in time-frequency and data symbols in an identical frequency-hopping pattern in time-frequency, the pilot symbols for each respective pattern in time-frequency inserted such that pilot symbols from different transmit antennas do not occupy the same location in time-frequency; and
    a channel estimator operable to compare the received pilot symbols to pilot symbol values known to be transmitted by a transmitter to estimate a channel between the transmitter and the receiver.

2. The OFDM receiver as defined in claim 1, wherein the channel estimator is operable for each transmit antenna/receive antenna combination:
    to estimate a channel response for each point in a respective pattern using the received pilot symbols;
    to estimate a channel response for each of a plurality of points not in the respective pattern by performing a two-dimensional (time direction, frequency direction) interpolation of channel responses determined for points in the respective pattern; and
    to perform an interpolation in the frequency direction to estimate channel responses corresponding to remaining OFDM sub-carriers within each OFDM symbol.

3. The OFDM receiver as defined in claim 2, wherein the channel estimator is operable to filter the channel responses prior to interpolating in the frequency direction to estimate the channel responses corresponding to remaining OFDM sub-carriers within each OFDM symbol.

4. The OFDM receiver as defined in claim 3, wherein the channel estimator is operable to filter the channel responses by performing a three-point smoothing operation.

5. The OFDM receiver as defined in claim 2 wherein the channel estimator is operable to estimate the channel response of a plurality of points not in the respective pattern by performing a two-dimensional interpolation of channel responses for each of a plurality of points in the respective pattern by, for each sub-carrier to be estimated, averaging:
    a channel response of the given channel estimation period of a sub-carrier before the sub-carrier to be estimated in frequency (when present);
    a channel response of the given channel estimation period of a sub-carrier after the sub-carrier to be estimated in frequency (when present);
    a channel response for a previous estimation period (when present); and
    a channel response for a following estimation period (when present).

6. The OFDM receiver as defined in claim 2, wherein the channel estimator is operable to perform an interpolation in the frequency direction by:
    performing a linear interpolation for sub-carriers at a lowest useful frequency or a highest useful frequency within the OFDM symbol; and
    performing a cubic Lagrange interpolation for sub-carriers not at the lowest or highest useful frequency.

7. The OFDM receiver as defined in claim 1, wherein the OFDM symbols transmitted from each antenna comprise information identifying a particular form of pre-processing used to encode the received pilot symbols from at least one source, the OFDM receiver further comprising differentiating pilot logic operable to process the information identifying the particular form of pre-processing used to encode the received pilot symbols to differentiate between received pilot symbols from different sources.

8. The OFDM receiver as defined in claim 7, wherein the differentiating pilot logic is operable to process the information identifying the particular form of pre-processing used to encode the received pilot symbols to differentiate between received pilot symbols from different sources occurring at a same time-frequency location.

9. A method of processing OFDM symbols transmitted from a plurality of transmit antennas, the OFDM symbols transmitted from each transmit antenna comprising pilot symbols in a respective pattern in time-frequency and data symbols in an identical frequency-hopping pattern in time-frequency, the pilot symbols for each respective pattern in time-frequency inserted such that pilot symbols from different transmit antennas do not occupy the same location in time-frequency, the method comprising:
    receiving the OFDM symbols on at least one receive antenna; and
    comparing the received pilot symbols to pilot symbol values known to be transmitted by a transmitter to estimate a channel between the transmitter and the receiver.

10. The method as defined in claim 9, further comprising, for each transmit antenna/receive antenna combination:
    estimating a channel response for each point in a respective pattern using the received pilot symbols;
    estimating a channel response for each of a plurality of points not in the respective pattern by performing a two-dimensional (time direction, frequency direction) interpolation of channel responses determined for points in the respective pattern; and
    performing an interpolation in the frequency direction to estimate channel responses corresponding to remaining OFDM sub-carriers within each OFDM symbol.

11. The method as defined in claim 10, further comprising filtering the channel responses prior to interpolating in the frequency direction to estimate the channel responses corresponding to remaining OFDM sub-carriers within each OFDM symbol.

12. The method as defined in claim 11, wherein the step of filtering the channel responses comprises performing a three-point smoothing operation.

13. The method as defined in claim 10, wherein the step of estimating the channel response of a plurality of points not in the respective pattern by performing a two-dimensional interpolation of channel responses for each of a plurality of points in the respective pattern comprises, for each sub-carrier to be estimated, averaging:
    a channel response of the given channel estimation period of a sub-carrier before the sub-carrier to be estimated in frequency (when present); a channel response of the given channel estimation period of a sub-carrier after the sub-carrier to be estimated in frequency (when present);
    a channel response for a previous estimation period (when present); and
    a channel response for a following estimation period (when present).

14. The method as defined in claim 10, wherein the step of performing an interpolation in the frequency direction comprises:

performing a linear interpolation for sub-carriers at a lowest useful frequency or a highest useful frequency within the OFDM symbol; and performing a cubic Lagrange interpolation for sub-carriers not at the lowest or highest useful frequency.

15. The method as defined in claim 9, wherein the OFDM symbols further comprise information identifying a particular form of pre-processing used to encode the received pilot symbols from at least one source, the method further comprising processing the information identifying the particular form of pre-processing used to encode the received pilot symbols to differentiate between received pilot symbols from different sources.

16. The method as defined in claim 15, wherein the step of processing the information identifying the particular form of pre-processing used to encode the received pilot symbols to differentiate between received pilot symbols from different sources differentiates between received pilot symbols from different sources occurring at a same time-frequency location.

* * * * *